US011729151B2

(12) United States Patent
Swahn

(10) Patent No.: US 11,729,151 B2
(45) Date of Patent: Aug. 15, 2023

(54) RIGHTS CONTROLLED COMMUNICATION

(71) Applicant: Alan Earl Swahn, Fairview, PA (US)

(72) Inventor: Alan Earl Swahn, Fairview, PA (US)

( * ) Notice: Subject to any disclaimer, the term of this patent is extended or adjusted under 35 U.S.C. 154(b) by 663 days.

(21) Appl. No.: 16/849,663

(22) Filed: Apr. 15, 2020

(65) Prior Publication Data

US 2020/0244630 A1 Jul. 30, 2020

Related U.S. Application Data

(63) Continuation of application No. 15/816,526, filed on Nov. 17, 2017, now Pat. No. 10,645,066.

(Continued)

(51) Int. Cl.

| | |
|---|---|
| ***H04L 9/40*** | (2022.01) |
| ***H04L 9/32*** | (2006.01) |
| ***G06F 21/60*** | (2013.01) |
| ***H04L 67/06*** | (2022.01) |
| ***H04L 9/06*** | (2006.01) |
| ***H04L 9/08*** | (2006.01) |

(Continued)

(52) U.S. Cl.

CPC .......... *H04L 63/0428* (2013.01); *G06F 21/10* (2013.01); *G06F 21/606* (2013.01); *G06F 21/608* (2013.01); *H04L 9/0656* (2013.01); *H04L 9/0894* (2013.01); *H04L 9/3226* (2013.01); *H04L 67/06* (2013.01); *H04L 67/10* (2013.01); *H04L 2209/60* (2013.01); *H04L 2209/80* (2013.01); *H04L 2463/101* (2013.01); *H04N 1/32101* (2013.01); *H04N 2201/3246* (2013.01); *H04W 84/12* (2013.01)

(58) Field of Classification Search

CPC ............ H04L 63/0428; H04L 63/0435; H04L 2463/101; H04L 9/0656; H04L 9/0894; H04L 9/3226; H04L 2209/60; H04L 2209/603; H04L 2209/80; H04L 67/06; H04L 67/10; G06F 21/10; G06F 21/606; G06F 21/608; G06F 21/6209; G06F 2221/0722; G06F 2221/0753; H04N 1/32101; H04N 2201/3246; H04W 81/12

See application file for complete search history.

(56) References Cited

U.S. PATENT DOCUMENTS

| | | | |
|---|---|---|---|
| 7,073,063 | B2 | 7/2006 | Peinado |
| 7,082,536 | B2 | 7/2006 | Filipi-Martin et al. |

(Continued)

*Primary Examiner* — Minh Dinh

(74) *Attorney, Agent, or Firm* — Cherskov Flaynik & Gurda, LLC

(57) ABSTRACT

A computerized process is described for transferring content from a first entity to a second entity including first transferring separately and via a database entity for each content: a content identifier, content rights, a content encryption key, a content initialization vector, a content encryption count, and a first entity identifier. Included with the transferred content is a transfer identifier, which is encrypted. After transferred content is received by the second entity, the transfer identifier is used to retrieve the content rights, content encryption key, content encryption initialization vector, content encryption count, and first entity identifier from the database entity. After receiving the content, both actions taken on the content and disposition of the content at the second entity are controlled according to the content rights by the first entity and the status of the content is reported to the first entity via a database entity.

18 Claims, 43 Drawing Sheets

RCC Distributed Network Embodiment

Related U.S. Application Data

(60) Provisional application No. 62/424,440, filed on Nov. 19, 2016.

(51) Int. Cl.

| | |
|---|---|
| ***G06F 21/10*** | (2013.01) |
| *H04L 67/10* | (2022.01) |
| *H04N 1/32* | (2006.01) |
| *H04W 84/12* | (2009.01) |

(56) References Cited

U.S. PATENT DOCUMENTS

| | | | | |
|---|---|---|---|---|
| 7,099,478 | B2 | 8/2006 | Tomlinson | |
| 7,421,411 | B2 | 9/2008 | Kontio et al. | |
| 7,496,750 | B2 | 2/2009 | Kumar et al. | |
| 7,987,272 | B2 | 7/2011 | Kumar et al. | |
| 7,996,556 | B2 | 8/2011 | Raghavan et al. | |
| 9,003,548 | B2 | 4/2015 | Pigin | |
| 2003/0120601 | A1 | 6/2003 | Ouye et al. | |
| 2004/0003139 | A1 | 1/2004 | Cottrille et al. | |
| 2005/0071280 | A1* | 3/2005 | Irwin | H04L 63/065 705/59 |
| 2005/0256834 | A1 | 11/2005 | Millington et al. | |
| 2008/0127315 | A1 | 5/2008 | Kim | |
| 2009/0327714 | A1 | 12/2009 | Yaghmour | |
| 2013/0198521 | A1* | 8/2013 | Wu | H04L 9/3263 713/175 |
| 2016/0191472 | A1 | 6/2016 | Ghafourifar | |
| 2016/0277368 | A1* | 9/2016 | Narayanaswamy | G06F 21/6209 |

* cited by examiner

RCC Player Independent Use Embodiment

Device Profile Table In Database Entity 801 802

| Field | Stored Form |
|---|---|
| Device Identification (DID) | Not encrypted |
| User Encryption Initialization Vector (UIV) | Not encrypted |
| Wide Area Network Address (WANA) | Encrypted using Program Key & UIV |
| Wide Area Network Port (WANP) | Encrypted using Program Key & UIV |
| Wired Local Area Network Address (WLANA) | Encrypted using Program Key & UIV |
| Wired Local Area Network Port (WLANP) | Encrypted using Program Key & UIV |
| Wireless Local Area Network Address (LLANA) | Encrypted using Program Key & UIV |
| Wireless Local Area Network Port (LLANP) | Encrypted using Program Key & UIV |
| Wired or Wireless Preference (WP) | Encrypted using Program Key & UIV |
| WAN or LAN Preference (WL) | Encrypted using Program Key & UIV |

803

Device Profile

<DID 1><UIV><WANA><WANP><WLANA><WLANP><LLANA><LLANP><WP><WL>
<DID 2><UIV><WANA><WANP><WLANA><WLANP><LLANA><LLANP><WP><WL>
<DID n><UIV><WANA><WANP><WLANA><WLANP><LLANA><LLANP><WP><WL>

Figure 8

User Profile Table In Database Entity 901 902

| Field | Stored Form |
|---|---|
| User Identification (UID) | Not encrypted |
| User Encryption Initialization Vector (UIV) | Not encrypted |
| User Password (UP) | Encrypted using Program Key & UIV |
| Availability (AVL) | Encrypted using Program Key & UIV |
| Device Identification (DID) | Encrypted using Program Key & UIV |

903

User Profile

<UID 1><UIV><UP><AVL><DID 1><DID 2><DID n>

<UID 2><UIV><UP><AVL><DID 1><DID 2><DID n>

<UID n><UIV><UP><AVL><DID 1><DID 2><DID n>

Figure 9

Transfer Control Package Table In Database Entity 1001 1003

| Field | Stored Form |
|---|---|
| Transfer Identification (TID) | Encrypted using Program Key & Recipient UIV |
| Sender User ID (Sender UID) | Encrypted using Program Key & Recipient UIV |
| Transfer Encryption Key (TEK) | Encrypted using Program Key & Recipient UIV |
| Transfer Encryption Initialization Vector (TIV) | Encrypted using Program Key & Recipient UIV |
| Transfer Encryption Count (TEC) | Encrypted using Program Key & Recipient UIV |
| Transfer Component Message Digest (TCMD) | Encrypted using Program Key & Recipient UIV |
| Rights Viewable (RV) | Encrypted using Program Key & Recipient UIV |
| Views Permitted (VP) | Encrypted using Program Key & Recipient UIV |
| Print (PR) | Encrypted using Program Key & Recipient UIV |
| Copy (CP) | Encrypted using Program Key & Recipient UIV |
| Forward (FD) | Encrypted using Program Key & Recipient UIV |
| Transfer Components Deleted (TD) | Encrypted using Program Key & Recipient UIV |
| Transfer Component Altered (TCA) | Encrypted using Program Key & Recipient UIV |
| Transfer Augmented (TA) | Encrypted using Program Key & Recipient UIV |
| Delete (DL) | Encrypted using Program Key & Recipient UIV |
| Delete After (DA) | Encrypted using Program Key & Recipient UIV |
| Lock (LK) | Encrypted using Program Key & Recipient UIV |
| Lock After (LA) | Encrypted using Program Key & Recipient UIV |
| Password (TP) | Encrypted using Program Key & Recipient UIV |

1002

Rights

Transfer Control Package

1004

<TID 1><Sender UID><TEK><TIV><TEC><RV><VP><PR><CP><FD><TD><TCA><TA><DL><DA><LK><LA><TP><TCMD 1><TCMD n>

<TID 2><Sender UID><TEK><TIV><TEC><RV><VP><PR><CP><FD><TD><TCA><TA><DL><DA><LK><LA><TP><TCMD 1><TCMD n>

<TID n><Sender UID><TEK><TIV><TEC><RV><VP><PR><CP><FD><TD><TCA><TA><DL><DA><LK><LA><TP><TCMD 1><TCMD n>

Figure 10

Named Copy Processes Table In Database Entity 1101 1102

| Field | Stored Form |
|---|---|
| Process Name | Not encrypted |
| Vendor | Not encrypted |
| Software Name | Not encrypted |

1103

Named Copy Processes

| Process Name | Vendor | Software Name |
|---|---|---|
| Snippingtool.exe | Microsoft Corporation | Snipping tool |
| FSCapture.exe | FastStone Soft | FastStone Capture |
| SnagitEditor.exe | TechSmith Corporation | Snagit |
| Jing.exe | TechSmith Corporation | Jing |
| Clip2net.exe | Clip2net | Clip2net |
| <Process Name n> | <Vendor n> | <Software Name n> |

Figure 11

Named Copy Services Table In Database Entity 1201 1202

| Field | Stored Form |
|---|---|
| Service Name | Not encrypted |
| Vendor | Not encrypted |
| Software Name | Not encrypted |

Transfer Status Table In Database Entity 1301 1302

| Field | Stored Form |
|---|---|
| Transfer Identification (TID) | Encrypted using Program Key & Recipient UIV |
| Received date and time (RD) | Encrypted using Program Key & Recipient UIV |
| Forwarded date and time (FD) | Encrypted using Program Key & Recipient UIV |
| Augmented before forward (GF) | Encrypted using Program Key & Recipient UIV |
| Forwarded to Sender's Friend UID (FF) | Encrypted using Program Key & Recipient UIV |
| Locked date and time (LD) | Encrypted using Program Key & Recipient UIV |
| Deleted date and time (DD) | Encrypted using Program Key & Recipient UIV |
| Deleted date and time according to Rights (DR) | Encrypted using Program Key & Recipient UIV |
| Copy program stopped name (CN) | Encrypted using Program Key & Recipient UIV |
| Copy service stopped name (SN) | Encrypted using Program Key & Recipient UIV |

1303

Transfer Status

<TID 1><RD><FD><GF><FF><LD><DD><DR><CN><SN>
<TID 2><RD><FD><GF><FF><LD><DD><DR><CN><SN>
<TID n><RD><FD><GF><FF><LD><DD><DR><CN><SN>

Figure 13

Transfer Component Status Table In Database Entity 1401 1402

| Field | Stored Form |
|---|---|
| Transfer Identification (TID) | Encrypted using Program Key & Recipient UIV |
| Transfer Component Designator (TC) | Encrypted using Program Key & Recipient UIV |
| Deleted before forward (DF) | Encrypted using Program Key & Recipient UIV |
| Altered before forward (AF) | Encrypted using Program Key & Recipient UIV |
| Viewed (VD) | Encrypted using Program Key & Recipient UIV |
| Printed (PD) | Encrypted using Program Key & Recipient UIV |
| Copied (CD) | Encrypted using Program Key & Recipient UIV |
| Viewing Stopped (VS) | Encrypted using Program Key & Recipient UIV |
| Printing Stopped (PS) | Encrypted using Program Key & Recipient UIV |
| Copying Stopped (CS) | Encrypted using Program Key & Recipient UIV |
| Forwarding Stopped (FS) | Encrypted using Program Key & Recipient UIV |

1403

Transfer Component Status

<TID 1><TC 1><DF><AF><VD><PD><CD><VS><PS><CS><FS>
<TID 1><TC 2><DF><AF><VD><PD><CD><VS><PS><CS><FS>
<TID 1><TC n><DF><AF><VD><PD><CD><VS><PS><CS><FS>
<TID 2><TC 1><DF><AF><VD><PD><CD><VS><PS><CS><FS>
<TID 2><TC 2><DF><AF><VD><PD><CD><VS><PS><CS><FS>
<TID 2><TC n><DF><AF><VD><PD><CD><VS><PS><CS><FS>
<TID n><TC 1><DF><AF><VD><PD><CD><VS><PS><CS><FS>
<TID n><TC 2><DF><AF><VD><PD><CD><VS><PS><CS><FS>
<TID n><TC n><DF><AF><VD><PD><CD><VS><PS><CS><FS>

Figure 14

Transfer Structure

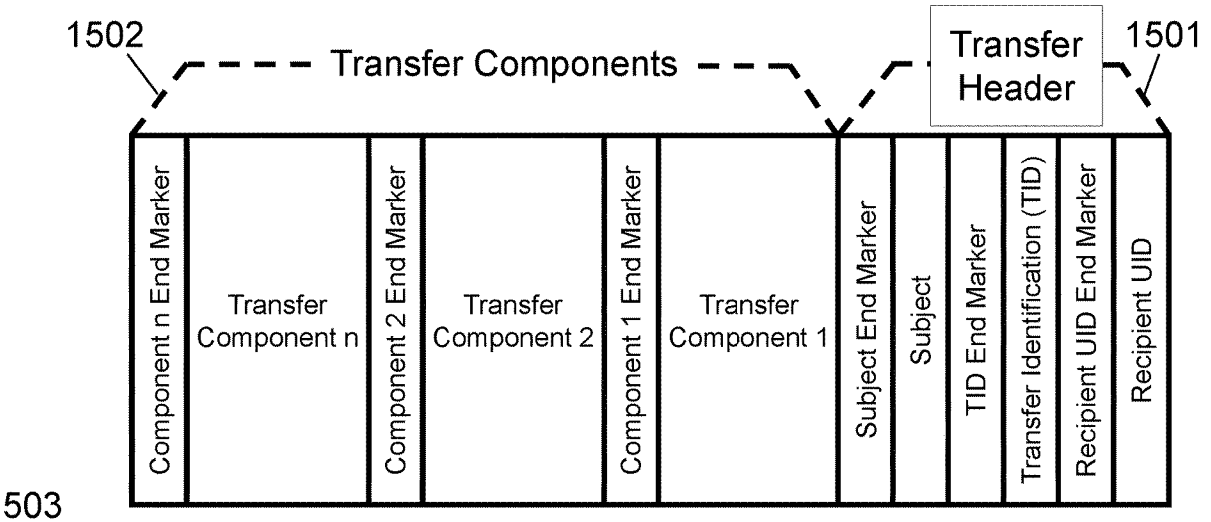

1503

| Transfer | Form |
|---|---|
| Recipient UID | Encrypted using Program Key and Recipient UIV |
| Recipient UID End Marker | Not Encrypted |
| Transfer Identification (TID) | Encrypted twice using Program Key and Recipient UIV |
| TID End Marker | Not Encrypted |
| Subject | Encrypted TEC times using TEK and TIV |
| Subject End Marker | Not Encrypted |
| Transfer Components | Encrypted TEC times using TEK and TIV |
| Component End Markers | Not Encrypted |

Figure 15

Send Transfer For Each Recipient Device Flowchart (continued)

Enforce Rights After Polling Flowchart

Enforce Rights In Action Context Flowchart

Transfer Display Copy Protection—Computer Keys—Flowchart

Transfer Display Copy Protection—RCCP Focus Lost—Flowchart

Transfer Display Copy Protection—RCCP Focus Gained—Flowchart

Transfer Display Copy Protection—Computer Pointer—Flowchart

Transfer Display Copy Protection—Services—Flowchart

RIGHTS CONTROLLED COMMUNICATION

CLAIM OF PRIORITY

This application claims priority as a continuation to U.S. application Ser. No. 15/816,526 filed on Nov. 17, 2017, currently pending. In turn, U.S. application Ser. No. 15/816,526 is a non-provisional of U.S. Provisional Patent Application Ser. No. 62/424,440 filed on Nov. 19, 2016, presently expired. The contents of each application are incorporated hereby by reference.

FIELD OF THE INVENTION

This invention, rights controlled communication, hereinafter referred to as "RCC" relates to (i) a networked communications environment;
(ii) the operation of information exchange applications;
(iii) controlling the disposition of information once exchanged;
(iv) controlling what actions can be taken on information once exchanged;
(v) providing detailed feedback to the author/sender regarding the disposition of information once exchanged; and
(vi) providing detailed feedback to the author/sender regarding what actions have been taken on information once exchanged.

BACKGROUND

Information exchange systems include, but are not limited to, electronic mail ("email"), instant messaging, chat, and streaming video. The information may be persistent, as in email systems or non-persistent, as in chat. Some systems like email rely on a client-server paradigm, where a server is between people communicating and may hold, process, or forward such email. Other systems are peer to peer, in which parties communicate directly, have the same capabilities, and where any party can initiate a communication session. Servers may be involved for authentication, login, and similar management functions.

These systems dominate how people communicate on a daily basis and make it extremely easy for people to communicate, but there may be personal costs and risks to users of these systems. Information is created by an author ("Sender") and sent/downloaded to/by a recipient ("Recipient"). Servers may hold the information between such transactions of sending and receiving. Servers that hold such information between the Sender and Recipient may be fairly secure, but there have been cases where unauthorized users gained access to such servers and exposed Sender's information. Noteworthy examples include instances of unauthorized access to various cloud-based computing and storage services, including the dissemination of photographs.

But the bigger source risk to the disposition of a Sender's information once sent, is by the Recipients themselves. Information received by a Recipient may be stored on a local device, replicated to other devices, forwarded to other Recipients, and/or otherwise generally shared beyond what the Sender intended. This common communications paradigm doesn't provide a way for a Sender to control the actions allowed to the information by a Recipient or control the disposition of such information.

The potential downside to the Sender in not having control of their information once sent, are consequences that include but are not limited to:

(i) pain and suffering;
(ii) embarrassment;
(iii) loss of confidentiality;
(iv) self-incrimination;
(v) violating third-party confidentiality; and
(vi) monetary loss.

A Recipient may rely on a crutch that the Sender should have known that their information did not have an expectation of privacy once sent, regardless of what is done with such information. However, this may be more of a failing of the associated communication system, in not having a mechanism for the Sender to control (i) what actions can be taken on their information by a Recipient; or (ii) the disposition of such information, collectively referred to as "information rights". A Sender must primarily rely on the goodwill of Recipients and any legal agreements that may be in place to safeguard the use and distribution of a Sender's information, which opens the door for information misuse.

Inventions to enforce information rights exist for email systems, but have a common failing of sending information rights from the Sender to Recipient as part of a header of such information and/or as instructions sent after the information has already been received by Recipient. Information rights sent as part of header can't be later altered, which precludes a Sender from changing the (i) actions that are permitted to be taken by a Recipient on the information; or (ii) disposition of the information. If information on the rights are sent as instructions after the information has already been received by Recipient, then enforcement of such instructions is not guaranteed, as a Recipient may have already exceeded them.

The most widely used information exchange system is electronic mail. It has a number of failings including a Recipient's receipt of irrelevant or inappropriate information ("SPAM") that may include or be linked to one or more malicious computer programs that may:

(i) delete or damage a Recipient's computer files (virus);
(ii) gain unauthorized access ("hack") to the Recipient's computer and control it remotely ("Trojan horse");
(iii) use the network of the receiving computer to send copies of itself to other computers ("worms");
(iv) track Internet browsing habits and send popups containing advertisements related to the sites and topics visited ("adware"); and
(v) scan a computer drive for personal information and Internet browsing habits and report such sensitive information to a third party ("spyware"), all collectively known as malware.

SPAM is typically sent to a Recipient from an unknown Sender and is unsolicited. Even if transmitted information does not contain malware or links to malware, it may still be unsolicited and waste a Recipient's time in processing the information. LinkedIn's InMail is a LinkedIn service that allows users to send information to people who are not first-degree connections. The Recipient has no choice in the matter to receive such unsolicited information.

A Sender's email message may contain sensitive information, which may be later discoverable. There may be occasions where the communicating parties don't want such information to be discoverable.

Email systems provide little or no feedback to a Sender of information, once such information has been sent to a Recipient. Microsoft Outlook clients and Exchange Server constitute a very popular email system that allows a Sender to request to be notified when a message has been opened by a Recipient. Unfortunately, this is flawed as the Recipient can read the information and deny such notification to the Sender. This precludes a Sender from knowing that the information sent to a Recipient has been opened by such Recipient. There is also no way for a Sender to know what actions have been taken on the information, such as, viewing, printing, copying, deleting, or forwarding.

In video delivery systems (e.g. Netflix) a Sender's information comprises video content that is typically streamed to a Recipient. It is understandable that businesses like Netflix wouldn't allow a movie to be downloaded to a device and later used, without a mechanism to restrict a Recipient's use of such movie. Without such a mechanism, new revenue streams may be precluded, such as offline viewing for an additional charge. Further, end users may seek to copy a streamed movie with streaming video capture utilities and further distribute it, without the approval of, or payment to, the Sender.

A solution is needed that overcomes these problems.

BRIEF DESCRIPTION OF THE DRAWINGS

The present invention is described with respect to particular exemplary embodiments thereof and reference is accordingly made to the drawings in which:

FIG. 8 depicts a user's Device Profile table in a Database Entity.

FIG. 9 depicts a user's User Profile table in a Database Entity.

FIG. 10 depicts a Transfer Control Package table in a Database Entity.

FIG. 11 depicts a Named Copy Processes table in a Database Entity that contains names of computer processes that may be used to capture Transfer Components and related information.

FIG. 13 depicts a Transfer Status table in a Database Entity that contains information to identify each Transfer and the associated Transfer Status.

FIG. 14 depicts a Transfer Component Status table in a Database Entity that contains information to identify each Transfer and the associated Transfer Component Status.

FIG. 15 shows the structure of a Transfer and indicates which portions are not Encrypted and which portions are Encrypted and how they are Encrypted.

DETAILED DESCRIPTION

SUMMARY OF NOTATIONS AND NOMENCLATURE

Figure 1:
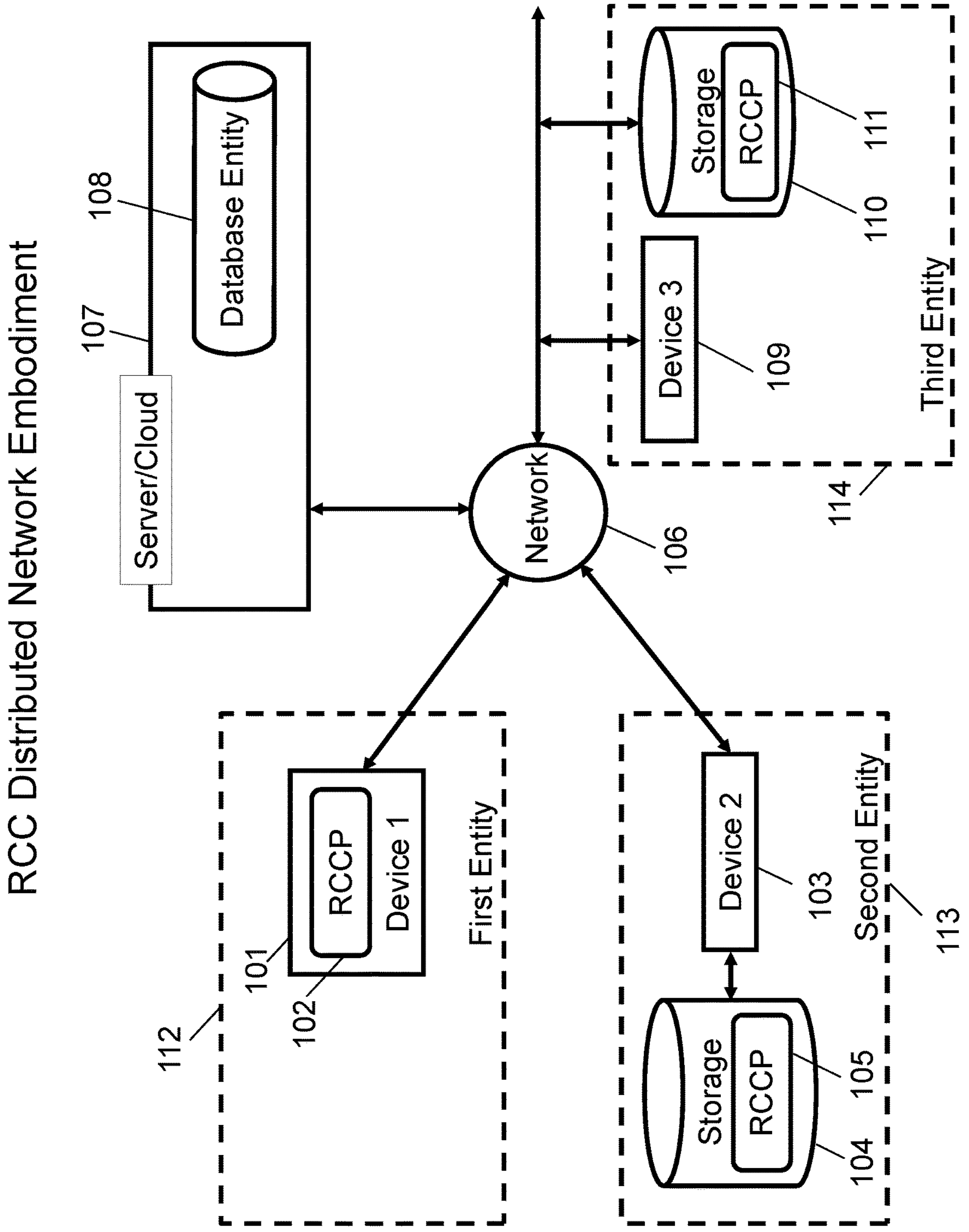
FIG. 1 shows a distributed Network environment for a plurality of Rights Controlled Communication Software Program ("RCCP") enabled computing devices and associated Database Entity, where the method of the invention may be implemented according to a preferred embodiment.

Found below is a brief overview of the acronyms and other notations used throughout the detailed description.

Transfer Identification—is a unique identifier for a Transfer ("TID" or "Transfer ID").

User Identification—is a unique identifier for an RCCP user ("UID" or "User ID").

Element—is text, an image, audio, or video.

Transfer Component—is a portion of a Transfer that contains one or more Elements or combinations thereof.

End Marker—is a digital marker in a file or network stream of data signifying the end of a Recipient User Identification, Transfer Identification, subject of the Transfer, Transfer Component, or other portion of a Transfer.

Transfer Header—is a Recipient User Identification, a plurality of Transfer Identifications associated with sending and forwarding a Transfer, and the subject of a Transfer.

Transfer Component Designator—is a unique identifier for a Transfer Component ("TC").

Transfer or Content—is a Transfer Header, Transfer Components, and associated End Markers amalgamated into one message or transferred content.

Actions—are a Sender's defined rights that control what actions a Recipient may take on a Transfer or Transfer Components, including but not limited to:
- (i) whether Rights are viewable ("RV");
- (ii) the number of views permitted before deleting ("VP");
- (iii) whether printing is permitted ("PR");
- (iv) whether copying is permitted ("CP");
- (v) whether forwarding is permitted ("FD");
- (vi) whether Transfer Components may be deleted, before forwarding a Transfer to other Recipients ("TD");
- (vii) whether a Transfer Component may be altered, before forwarding a Transfer to other Recipients ("TCA"); and
- (viii) whether Transfer may be augmented, before forwarding to other Recipients ("TA").

Disposition—is a Sender's defined rights that control the disposition of a Transfer sent to a Recipient, including but not limited to:
- (i) deleting ("DL");
- (ii) deleting after a particular date and/or time ("DA");
- (iii) locking to disable opening by a Recipient ("LK");
- (iv) locking to disable opening by a Recipient after a particular date and/or time ("LA"); and
- (v) a password required to open and its value ("TP").

Rights—are any combination of Actions and Disposition.

Transfer Control Package—are the Rights associated with each Transfer and:
- (i) Transfer Identification ("TID");
- (ii) Sender User Identification ("Sender UID");
- (iii) Transfer Encryption Key ("TEK");
- (iv) Transfer Encryption Initialization Vector ("TIV");
- (v) Transfer Encryption Count ("TEC"); and
- (vi) Transfer Component Message Digest ("TCMD") for each Transfer Component.

RCCP—is a Rights controlled communication software program that composes Transfers, displays one or more Transfer Components, sends Transfers, reads/writes Rights from/to a Database Entity, and facilitates the definition and enforcement of Rights.

RCC Player—is a Rights controlled communication player that is a subset of an RCCP that facilitates the enforcement of Rights, and displays one or more Transfer Components.

Device Profile—is a Device profile for an RCCP user including but not limited to:
- (i) Device Identification ("DID" or "Device ID");
- (ii) User Encryption Initialization Vector ("UIV");
- (iii) Wide Area Network Address ("WANA");
- (iv) Wide Area Network Port ("WANP");
- (v) Wired Local Area Network Address ("WLANA");
- (vi) Wired Local Area Network Port ("WLANP");
- (vii) Wireless Local Area Network Address ("LLANA");
- (viii) Wireless Local Area Network Port ("LLANP");
- (ix) Wired or Wireless Preference ("WP"); and
- (x) Wide Area Network ("WAN") or Local Area Network ("LAN") Preference ("WL").

User Profile—is a user profile for an RCCP user including but not limited to:
- (i) User Identification ("UID");
- (ii) User Encryption Initialization Vector ("UIV");
- (iii) User Password ("UP");
- (iv) Availability ("AVL"); and
- (v) Device Identification ("DID") for each user Device.

Named Copy Processes—are specific computer processes by name that represent software programs that may copy a whole or portion of a computer screen/display or capture streaming content.

Named Copy Services—are specific computer services by name that represent software services that may (i) copy a whole or portion of a computer screen/display or capture streaming content; or (ii) control software programs that may copy a whole or portion of a computer screen/display or capture streaming content.

Database Entity—is an organized collection of data that may take the form of a conventional relational database or alternately a file structure capable of storing data tables that include but are not limited to: Device Profile Table, User Profile Table, Transfer Control Package Table, Named Copy Processes Table, Named Copy Services Table, Transfer Status Table, and Transfer Component Status Table.

Client—is a computer software program (e.g. web browser) that can send instructions to RCCP and display information from RCCP or operate an RCC Player.

Storage—is a component or device and combinations thereof to store information, including but not limited to a hard disk ("HDD"), solid-state drive ("SSD"), hybrid drive ("SSHD") combining HDD and SSD, flash memory, flash memory mass storage device (e.g. CompactFlash), secure digital card ("SD card"), or permanent flash memory.

Device—is hardware generally consisting of a processing unit, memory, components that facilitate Network communications, and may have input and/or output for peripherals (e.g. printer, flash drive, optical disc drive, web cam, card reader, keyboard), and may have Storage; its software generally consists of an operating system, network access, a basic set of utilities, and may have a web browser.

Server—is a Device that provides access to a Database Entity and/or Transfer Storage and may run an instance of RCCP.

Machines—Devices and/or Servers.

Network—is a telecommunications network that allows Machines to exchange data through combinations of wired, optical, or wireless connections.

Message Digest—is a mathematical algorithm, cryptographic hash function, that maps data of arbitrary size to a bit string of a fixed size that may be used to check data integrity for information exchanged between communicating parties, where such an algorithm may be the Secure Hash Algorithm ("SHA-256") that produces a 256-bit message digest.

Transfer Component Message Digest—A Message Digest for a Transfer Component.

Transfer Status—is the Transfer Identification and status of a sent Transfer, including but not limited to:
- (i) date and time the Transfer was received by Recipient ("RD");
- (ii) whether a Transfer has been forwarded to another Recipient ("FD") and the date and time the Transfer was forwarded;
- (iii) whether a Transfer has been augmented by Recipient before forwarding to other Recipients ("GF");
- (iv) whether a Transfer has been forwarded to another Recipient and if a Friend of the Sender, the Friend's User Identification ("FF");
- (v) whether a Transfer is currently locked and the date and time of such locking ("LD");
- (vi) whether a Transfer has been deleted by the Recipient and the date and time of such deletion ("DD");
- (vii) whether a Transfer has been deleted according to the Rights associated with a Transfer and the date and time of such deletion ("DR");
- (viii) whether the execution of a copy program has been stopped and the name of such copy program ("CN"); and
- (ix) whether the execution of a copy service has been stopped and the name of the copy service ("SN").

Transfer Component Status—is the Transfer Identification, Transfer Component Designator, and status of each Transfer Component for a given Transfer at Recipient, including but not limited to:
- (i) whether a Transfer Component has been deleted before forwarding the Transfer to other Recipients ("DF");
- (ii) whether a Transfer Component has been altered before forwarding the Transfer to other Recipients ("AF");
- (iii) has been viewed ("VD");
- (iv) has been printed ("PD");
- (v) has been copied ("CD");
- (vi) viewing has been stopped ("VS");
- (vii) printing has been stopped ("PS");
- (viii) copying has been stopped ("CS"); and
- (ix) forwarding has been stopped ("FS").

Encryption or Encrypt—is the process of encoding messages or information in such a way that only authorized parties can read it, where each party needs the same key and initialization vector to encrypt and decrypt information exchanged between the parties, where one such specification for encryption is the Advanced Encryption Standard ("AES") that uses an initialization vector and 256-bit key for its algorithm.

Decryption or Decrypt—reverses the process of Encryption.

Encryption Key—a string of digital bits used by an Encryption algorithm.

Encryption Initialization Vector—is an initialization vector used with an Encryption Key to perform Encryption or Decryption.

Program Key—an Encryption Key internal to a particular RCCP model.

User Initialization Vector—a unique Encryption Initialization Vector used with a Program Key.

Transfer Encryption Key—an Encryption Key generated for each Transfer ("TEK").

Transfer Encryption Initialization Vector—an Encryption Initialization Vector generated for each Transfer ("TIV").

Transfer Encryption Count—a randomly generated integer in a set range for each Transfer that signifies the number of times information is Encrypted ("TEC").

Compression—is the process of encoding messages or information using fewer digital bits than the original representation, without loss of information after subsequent decompression.

Decompression—reverses the process of Compression.

Cloud—is a Network based pool of configurable computing resources (e.g., combinations of Networks, Servers, Storage, applications and services) that may be rapidly provisioned.

Friend—is an entity permitted by Recipient to send a Transfer to such Recipient.

Focus—indicates that a computer program is selected and is lost when such computer program is no longer selected.

This invention utilizes a telecommunications Network infrastructure utilizing a set of protocols, such as the Transmission Control Protocol/Internet Protocol (TCP/IP). Such Network infrastructure may include, but is not limited to: the Internet, Wide Area Networks (WANs), Metropolitan Area Networks (MANs), Local Area Networks (LANs), and other wired and wireless systems.

RCC provides mechanisms to:

(i) allow only the original Sender of a Transfer to define, control, and enforce Rights at any time in the lifecycle of a Transfer and regardless of a Transfer being forwarded by a plurality of Recipients;

(ii) allow receipt of a Transfer by Recipient only from Senders known to Recipient;

(iii) allow the sending and receiving of only known types of Transfer Components;

(iv) provide a Transfer Status and related Transfer Component Status to a Sender of a Transfer; and (v) defeat screen/display capture methods, when the Recipient has not been provided the right to copy a Transfer.

An embodiment of RCC may include, but is not limited to: a Network infrastructure that contains an RCCP that is executed by Senders and Recipients separately on their respective devices and a Database Entity that is hosted on Server that is network accessible by the Sender and any Recipients. For a Sender to send a Transfer, a connection must be established between the Sender's and Recipient's RCCP within a designated timeout period after connection initiation and therefore is time sensitive. An RCCP must also make a connection to a Database Entity to allow RCCP to read/query and write to such Database Entity. Any such connection must be established within a designated timeout period (time sensitive) or the connection will fail and RCCP operations that depend on having such a connection will subsequently fail. There are a number of RCCP operations that require a Database Entity connection, including but not limited to:

(i) before a Transfer can be sent to any Recipient, a Sender's RCCP must write a related Transfer Control Package to a table in a Database Entity;

(ii) before a Transfer can be sent to any Recipient, a Sender's RCCP must query a Database Entity for an intended Recipient's User Profile to understand when the Recipient will be available to receive Transfers;

(iii) before a Transfer can be sent to any Recipient, a Sender's RCCP must query a Database Entity for an intended Recipient's User Profile to understand what Recipient Devices will receive Transfers;

(iv) before a Transfer can be sent to any Recipient, a Sender's RCCP must query a Database Entity for an intended Recipient's Device Profile to understand the address and port of each Recipient's Device, so that a connection can be established between the Sender's RCCP and Recipient's RCCP on each Recipient Device;

(v) when receiving a Transfer, each Recipient's RCCP must query a Database Entity with the inbound Transfer Identification to:

(a) acquire the Sender User Identification and authenticate against Recipient's Friends; and (b) acquire the Transfer Encryption Key, Transfer Encryption Initialization Vector, and Transfer Encryption Count to decrypt the Transfer subject.

(vi) when opening a Transfer, each Recipient's RCCP must query a Database

Entity with the Transfer Identification to:

(a) acquire the Sender User Identification and authenticate against Recipient's Friends; and (b) acquire and enforce Rights;

(c) acquire the Transfer Encryption Key, Transfer Encryption Initialization Vector, and Transfer Encryption Count to decrypt Transfer Components; and (d) acquire each Transfer Component Message Digest to check the integrity of each Transfer Component.

(vii) each Recipient's RCCP when writing a Transfer Status and related Transfer Component Status for each received Transfer to tables in a Database Entity.

An important difference between RCC and other information exchange systems is the Rights pertaining to a Transfer are never sent with or after the Transfer itself. In an RCC paradigm, the Rights for a Transfer are downloaded by the Recipient's RCCP from a Database Entity, are network accessible, and enforceable.

Another difference is that the Sender of a Transfer is confirmed to be an entity that is permitted to send Transfers to a particular Recipient, thereby eliminating unsolicited Transfers and to a high degree, SPAM.

Unlike email systems, RCC doesn't include any information about the Sender or Transfer origination in the Transfer, transferred between a Sender and Recipient; therefore, the Sender and the Sender's origination aren't discoverable by intercepting a Transfer transmission. In addition, the Transfer is always encrypted, thereby making it very difficult to discover its contents.

Unlike email systems, RCC also provides a dynamic Transfer Status and Transfer Component Status to a Database Entity, so that the Sender of a Transfer will fully understand what Actions have been taken and the Disposition of such Transfer.

Unlike other content exchange systems, where the displayed Content may be easily captured by built-in operating system features, computer programs, and/or computer services, RCC defeats these copy methods through programming procedures that work in unison including:

(i) intercepting and altering the processing of particular computer key combinations;

(ii) detecting if an RCCP currently used to display and use Transfer Components has lost Focus and removing such Transfer Component and associated icon strip visibility;

(iii) detecting if a computer pointer (e.g. mouse) is outside of an RCCP's boundaries and removing such Transfer Component and associated icon strip visibility;

(iv) detecting certain computer processes that may be used to capture a computer screen/display and stopping their execution; and (v) detecting certain computer services that may be used to capture a computer screen/display and stopping their execution.

DESCRIPTION OF FIGURES

Turning to the figures, FIG. 1 shows a first entity 112 with a Device 101 executing an RCCP 102 from local Storage and communicating over a Network 106 with a second entity 113 with a Device 103 executing RCCP 105 from attached Storage 104 and communicating over the Network 106 with third entity 114 with a Device 109 executing RCCP 111 from Network attached Storage 110 that utilizes a Database Entity 108 operating on a Server or Cloud 107.

Figure 2:
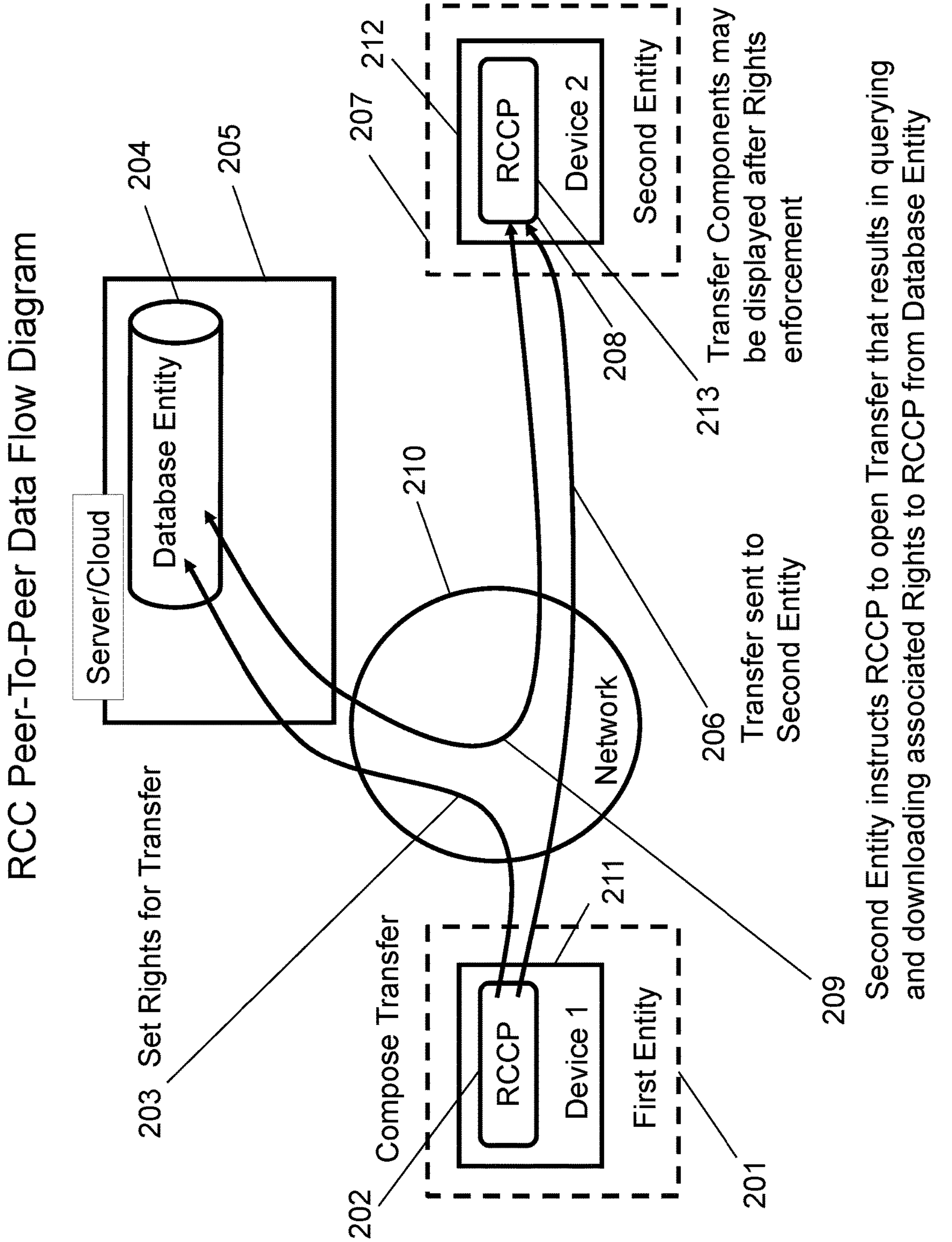
FIG. 2 shows a data flow diagram related to FIG. 1 of RCCP enabled computing devices communicating in a peer-to-peer fashion and the basic steps necessary to create, send, and receive a Transfer, as well as, setting and enforcing associated Rights.

FIG. 2 shows a first entity 201 using an RCCP 202 on a Device 211 composing a Transfer and setting 203 the Rights for such Transfer, where such Rights are saved over a Network 210 to a Database Entity 204 operating on a Server/Cloud 205. Such RCCP 202 then sends 206 the Transfer over the Network 210 to a second entity 207 using an RCCP 208 on a Device 212. After receipt of such Transfer, the second entity 207 instructs its RCCP 208 to open the Transfer that results in its RCCP 208 querying and downloading 209 over the Network 210 the Rights associated with such Transfer from Database Entity 204. RCCP 208 may then display Transfer Components 213 after Rights enforcement.

Figure 3:
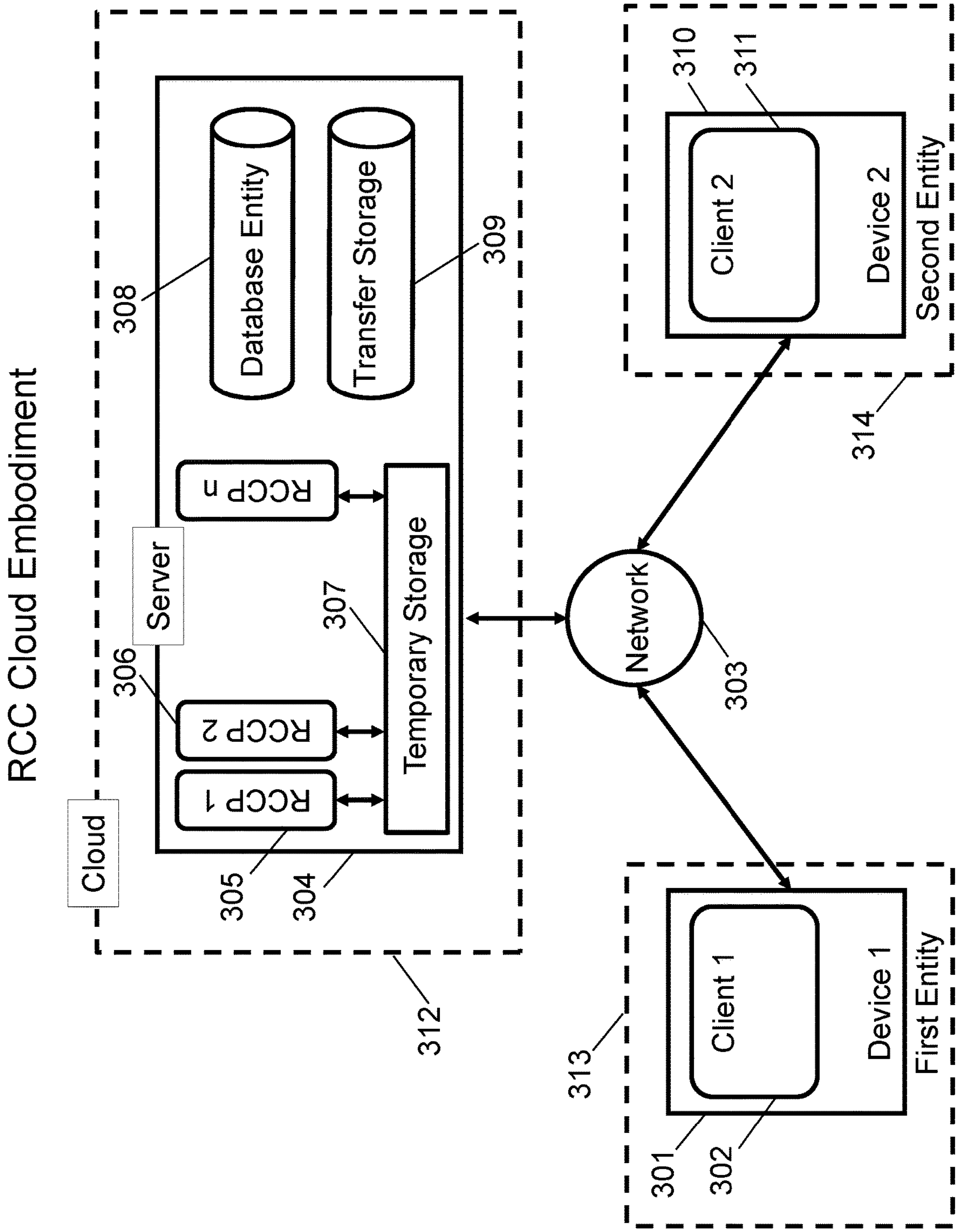
FIG. 3 shows a distributed Network environment for a plurality of Clients that operate RCCP remotely with RCCP, temporary Storage, Database Entity, and Transfer Storage in the Cloud, where the method of the invention may be implemented according to a preferred embodiment.

FIG. 3 shows a first entity 313 with a first Client 302 operating on a Device 301 and second entity 314 with a second Client 311 operating on a Device 310, where such Clients 302, 311 are sending instructions and Transfers over a Network 303 to a Server 304 that may be in a Cloud 312. First Client 302 is instructing a first RCCP instance 305 on Server 304 and second Client 311 is instructing a second RCCP instance 306 on Server 304. The Transfer Control Packages associated with Transfers are stored in a Database Entity 308 operating on Server 304 and the Transfers are stored in Transfer Storage 309. The first instance of RCCP 305 and the second instance of RCCP 306 may utilize temporary Storage 307. First Client 302 and second Client 311 are receiving Transfers from Transfer Storage 309 and displaying and operating on such Transfers according to the Rights stored in Database Entity 308.

Figure 4:
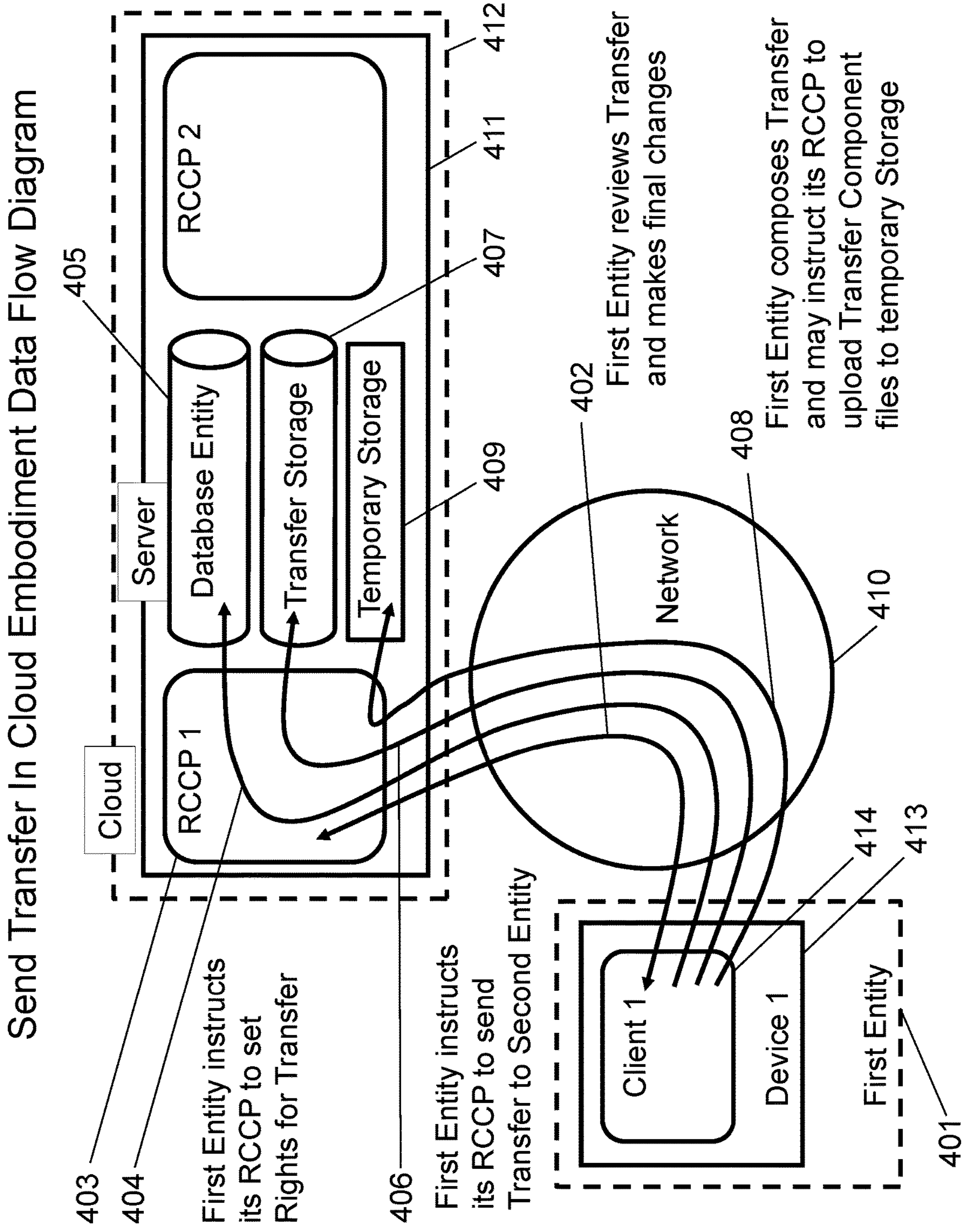
FIG. 4 shows a data flow diagram related to FIG. 3 of Clients communicating in an RCCP Cloud implementation and the basic steps necessary to create and send a Transfer, as well as, set the associated Rights.

FIG. 4 shows a first entity 401 with a Client 414 operating on a Device 413 comprising a Transfer and over a Network 410 instructs its RCCP instance 403 operating on a Server 411, that may be in a Cloud 412, to (i) upload 408 associated Transfer Component files to temporary Storage 409; (ii) review the Transfer and make final changes 402; and (iii) set 404 the associated Rights for such Transfer that are stored in a Database Entity 405 operating on Server 411. The first entity 401 instructs its RCCP 403 to send 406 the Transfer to Recipient(s), which causes the Transfer to be saved in Transfer Storage 407 waiting for the Recipient(s) to download the Transfer.

Figure 5:
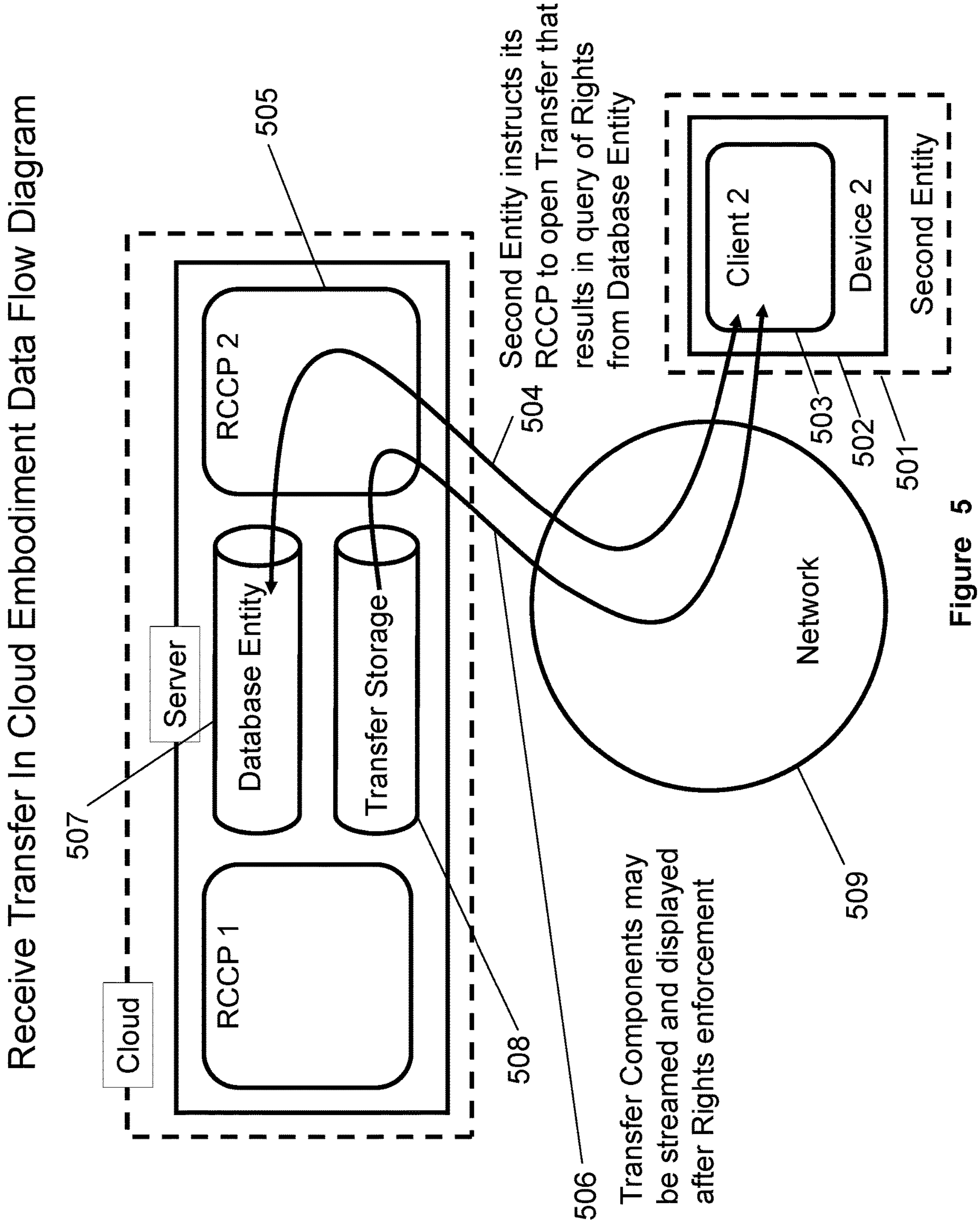
FIG. 5 shows a data flow diagram related to FIG. 3 of Clients communicating in an RCCP Cloud implementation and the basic steps necessary to receive and display a Transfer, after Rights enforcement.

FIG. 5 shows a second entity 501 with a Client 503 operating on a Device 502 that instructs 504 its RCCP instance 505 over a Network 509 to open a Transfer that results in the associated Rights of the Transfer being queried from Database Entity 507 and the Transfer Components being downloaded 506 from Transfer Storage 508 over the Network 509 to the Client 503 and displayed 506 after Rights enforcement.

Figure 6:
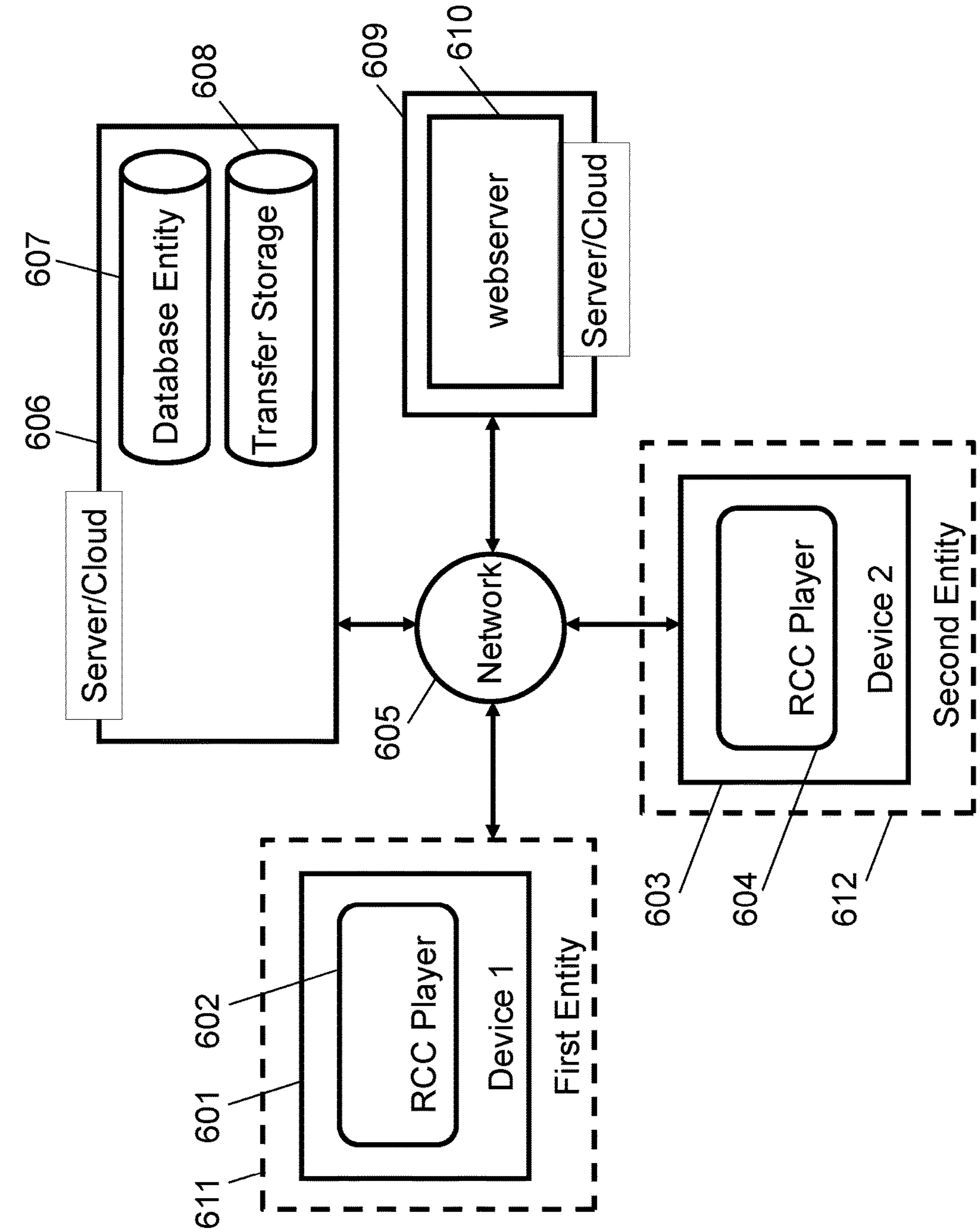
FIG. 6 shows a distributed Network environment for a plurality of Rights Controlled Communication ("RCC") Players communicating with a webserver that may provide hyperlinks to Transfers in Transfer Storage and associated Rights in a Database Entity for download to such RCC Players, where the method of the invention may be implemented according to a preferred embodiment.

FIG. 6 shows a first entity 611 operating an RCC Player 602 on a Device 601 and a Second Entity 612 operating an RCC Player 604 on a Device 603 and communicating over a Network 605 to a webserver 610 operating on Server 609. Webserver 610 is providing such RCC Players 602, 604 with hyperlinks to (i) Transfers in Transfer Storage 608; and (ii) associated Rights in a Database Entity 607 operating on Server 606. Such hyperlinks enable the RCC Players 602, 604 to download Transfers over the Network 605.

Figure 7:
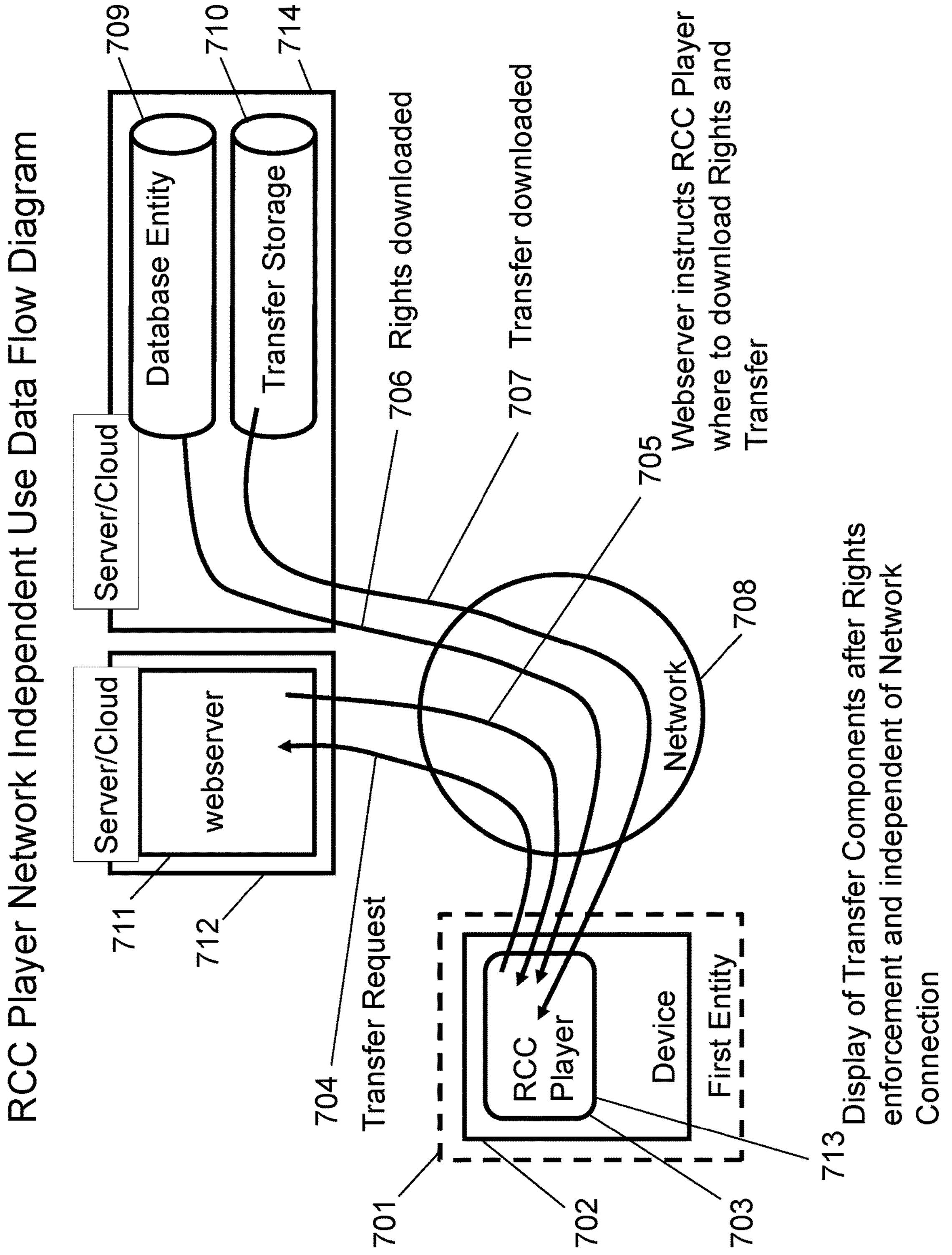
FIG. 7 shows a data flow diagram related to FIG. 6 with an RCC Player communicating to a webserver and requesting a Transfer, where such webserver provides hyperlinks to such Transfer in Transfer Storage and associated Rights in a Database Entity for download to an RCC Player and display of the Transfer Components after Rights enforcement and independent of an RCC Player having a network connection, after such download.

FIG. 7 shows a data flow diagram related to FIG. 6 where a first entity 701 is operating an RCC Player 703 on a Device 702 and communicating over a Network 708 to a webserver 711 operating on Server 712 and requesting 704 a Transfer. The webserver 711 provides 705 the RCC Player 703 with hyperlinks to (i) such Transfer in Transfer Storage 710; and (ii) associated Rights in a Database Entity 709 operating on a Server 714. The RCC Player 703 uses such hyperlinks to download 706 over the Network 708 the Rights associated with the Transfer and download 707 over the Network 708 the Transfer to RCC Player 703. The RCC Player 703 then displays the Transfer Components 713 after Rights enforcement and independent of RCC Player 703 having a network connection after such downloads.

FIG. 8 depicts a Device Profile table in a Database Entity. The fields 801 of the table are identified with descriptors. The field values 802 are stored in an Encrypted form using a Program Key and User Encryption Initialization Vector or unencrypted. The field values 803 when transferred to a Database Entity are also shown.

FIG. 9 depicts a User Profile table in a Database Entity. The fields 901 of the table are identified with descriptors. The field values 902 are stored in an Encrypted form using a Program Key and User Encryption Initialization Vector or unencrypted. The field values 903, when transferred to a Database Entity are also shown.

FIG. 10 depicts a Transfer Control Package table in a Database Entity. The fields 1001 of the table are identified with descriptors. The field values 1003 are stored in an Encrypted form using a Program Key and Recipient User Encryption Initialization Vector. The table entries 1002 associated with Rights are indicated. There is a Transfer Component Message Digest in the table for each Transfer Component in a Transfer. The field values 1004, when transferred to a Database Entity are also shown.

FIG. 11 depicts a Named Copy Processes table in a Database Entity. The fields 1101 of the table are identified with descriptors. The field values 1102 are stored in an unencrypted form. The names of computer processes that may be used to capture Transfer Components populate the table along with the associated vendors and/or software names 1103 as available.

Figure 12:
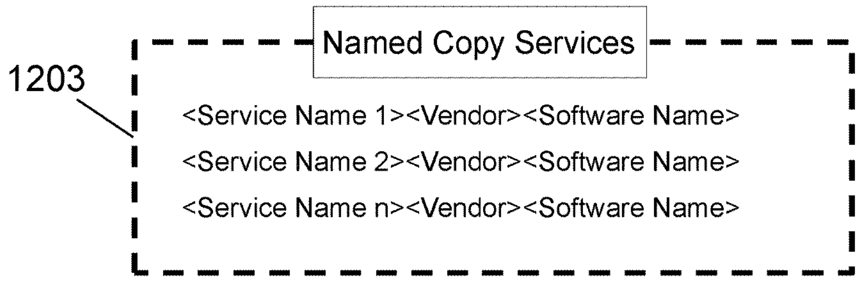
FIG. 12 depicts a Named Copy Services table in a Database Entity that contains names of computer services that may be used to capture Transfer Components and related information.

FIG. 12 depicts a Named Copy Services table in a Database Entity. The fields 1201 of the table are identified with descriptors. The field values 1202 are stored in an unencrypted form. The names of computer services that may be used to capture Transfer Components populate the table along with the associated vendors and/or software names 1203 as available.

FIG. 13 depicts a Transfer Status table in a Database Entity. The fields 1301 of the table are identified with descriptors. The field values 1302 are stored in an Encrypted form using a Program Key and Recipient User Encryption Initialization Vector. The field values 1303, when transferred to a Database Entity are also shown.

FIG. 14 depicts a Transfer Component Status table in a Database Entity that contains the Transfer Component Status for each Transfer. The fields 1401 of the table are identified with descriptors. The field values 1402 are stored in an Encrypted form using a Program Key and Recipient User Encryption Initialization Vector. The field values 1403, when transferred to such Database Entity are also shown.

FIG. 15 shows the structure of a Transfer made up of a Transfer Header 1501 and Transfer Components with associated End Markers 1502. Table 1503 shows the portions of the structure that are (i) Encrypted and how they are Encrypted; and (ii) unencrypted.

Figure 16:
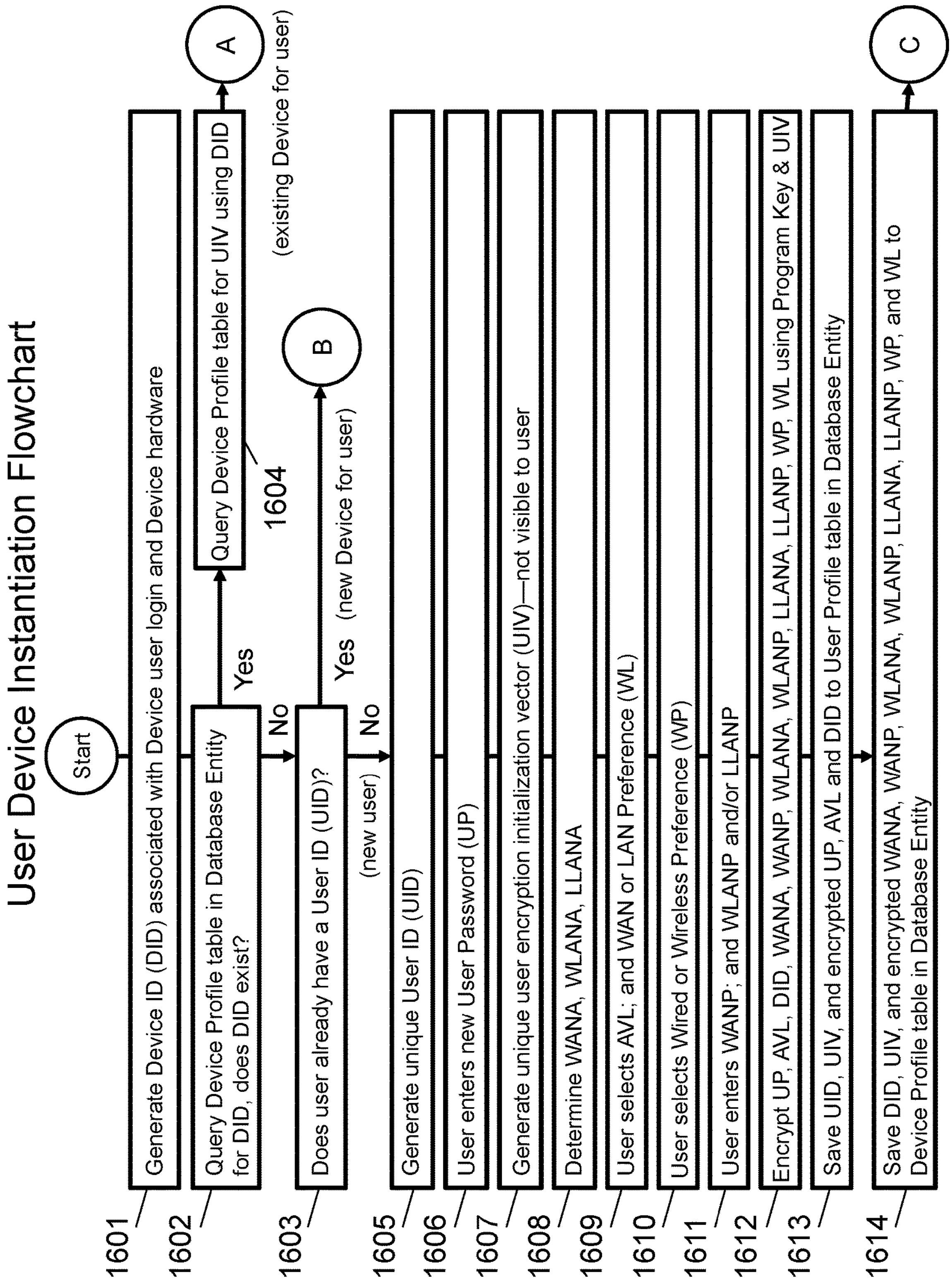
FIG. 16 shows a flowchart of RCCP starting execution on a Device, determining if the (i) Device is recognized and querying the Device Profile with continuation on FIG. 17; (ii) user is recognized with continuation on FIG. 18; or (iii) user and Device are new, thereby creating and saving a User Profile and Device Profile to tables in a Database Entity.

FIG. 16 shows a flowchart of RCCP starting execution on a Device. RCCP generates a Device ID 1601 associated with Device user login and Device hardware and queries a Device Profile table in a Database Entity to determine if the Device ID is known 1602. If the Device ID is known 1602, then RCCP queries 1604 the Device Profile for the User Encryption Initialization Vector using such Device ID with continuation on FIG. 17. If the Device ID is unknown, then RCCP checks 1603 whether the user has a User ID. If the user has a User ID, then this Device is a new Device for such user and the process continues on FIG. 18. If the user has no User ID, then the user is new and a unique User ID is generated 1605. The user is now required to enter a User Password 1606. A User Encryption Initialization Vector 1607 is generated and not shown to the user. The Device's associated Wide Area Network Address, Wired Local Area Network Address, and Wireless Local Area Network Address are discovered 1608, if available. The user selects their (i) window of Availability and Wide Area Network or Local Area Network Preference 1609; and (ii) Wired or Wireless Preference 1610. The user then enters 1611 their Wide Area Network Port, Wired Local Area Network Port, and/or Wireless Local Area Network Port. Subsequently the User Password, Availability, Device ID, Wide Area Network Address, Wide Area Network Port, Wired Local Area Network Address, Wired Local Area Network Port, Wireless Local Area Network Address, Wireless Local Area Network Port, Wired or Wireless Preference, and Wide Area Network or Local Area Network Preference are Encrypted 1612 using a Program Key and User Encryption Initialization Vector. The unencrypted User ID and User Encryption Initialization Vector, as well as, the Encrypted User Password, Availability, and Device ID are saved 1613 to a User Profile table in the Database Entity. The unencrypted Device ID and User Encryption Initialization Vector, as well as, the Encrypted Wide Area Network Address, Wide Area Network Port, Wired Local Area Network Address, Wired Local Area Network Port, Wireless Local Area Network Address, Wireless Local Area Network Port, Wired or Wireless Preference, and Wide Area Network or Local Area Network Preference are saved 1614 to the Device Profile table in the Database Entity with continuation on FIG. 17.

Figure 17:
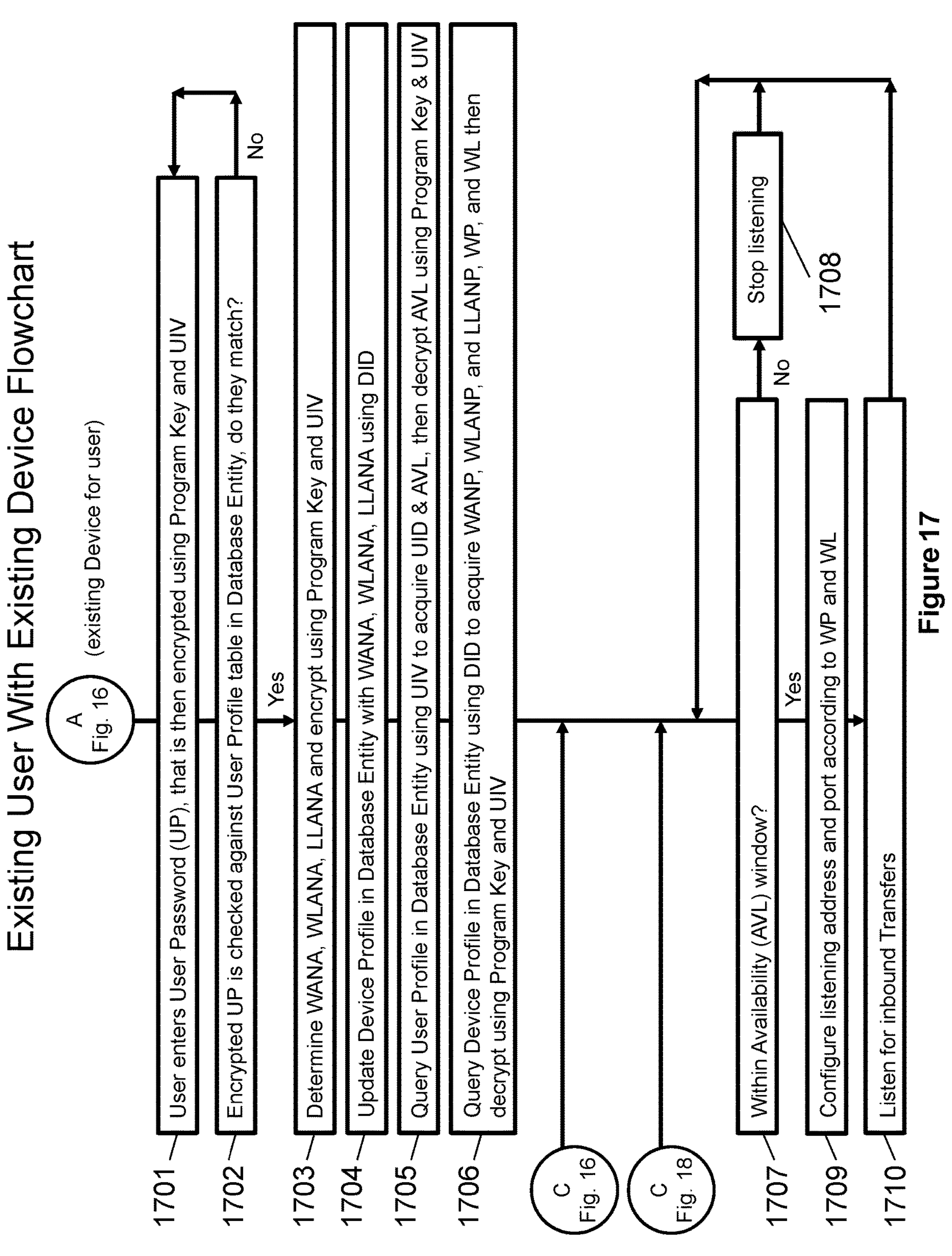
FIG. 17 shows a continuation of the (i) flowcharts depicted in FIG. 16 and FIG. 18 and configuring RCCP to listen for Transfers, if within the user's availability window; and (ii) flowchart depicted in FIG. 16 for an existing user and Device, checking the user's password, retrieving and decrypting User Profile and Device Profile information, and configuring RCCP to listen for Transfers, if within the user's availability window.

FIG. 17 shows a flowchart that continues from FIG. 16 designation A for a user's existing Device. The user is prompted and enters 1701 their User Password, which is Encrypted using the Program Key and User Encryption Initialization Vector and compared against the Encrypted User Password that is stored in the User Profile table in the Database Entity and if they don't match 1702 the user is prompted to enter 1701 their User Password again. If they do match 1702, the Device's Wide Area Network Address, Wired Local Area Network Address, and Wireless Local Area Network Address, as available, are discovered and Encrypted 1703 using the Program Key and User Encryption Initialization Vector. The Device Profile in the Database Entity is updated 1704 with such Encrypted Wide Area Network Address, Wired Local Area Network Address, and/or Wireless Local Area Network Address using the Device ID. The User Profile is queried 1705 using the User Encryption Initialization Vector to acquire the unencrypted User ID and Encrypted Availability, where Availability is subsequently Decrypted using the Program Key and User Encryption Initialization Vector. The Device Profile is queried 1706 using the Device ID to acquire the Encrypted Wide Area Network Port, Wired Local Area Network Port, Wireless Local Area Network Port, Wired or Wireless Preference, and Wide Area Network or Local Area Network Preference which are subsequently Decrypted using the Program Key and User Encryption Initialization Vector. At this point in the flowchart there is a continuation from (i) FIG. 16 designation C; (ii) FIG. 18 designation C; and (iii) FIG. 17 after listening 1710 for inbound Transfers or after stopping to listen 1708 for Transfers. Next the Availability window is checked and if not within the Availability window 1707 then stop listening 1708 for Transfers. If within the Availability window 1707, then (i) the listening address and port are configured 1709 according to Wired or Wireless Preference and Wide Area Network or Local Area Network Preference; and (ii) listen 1710 for inbound Transfers, while within Availability window 1707.

Figure 18:
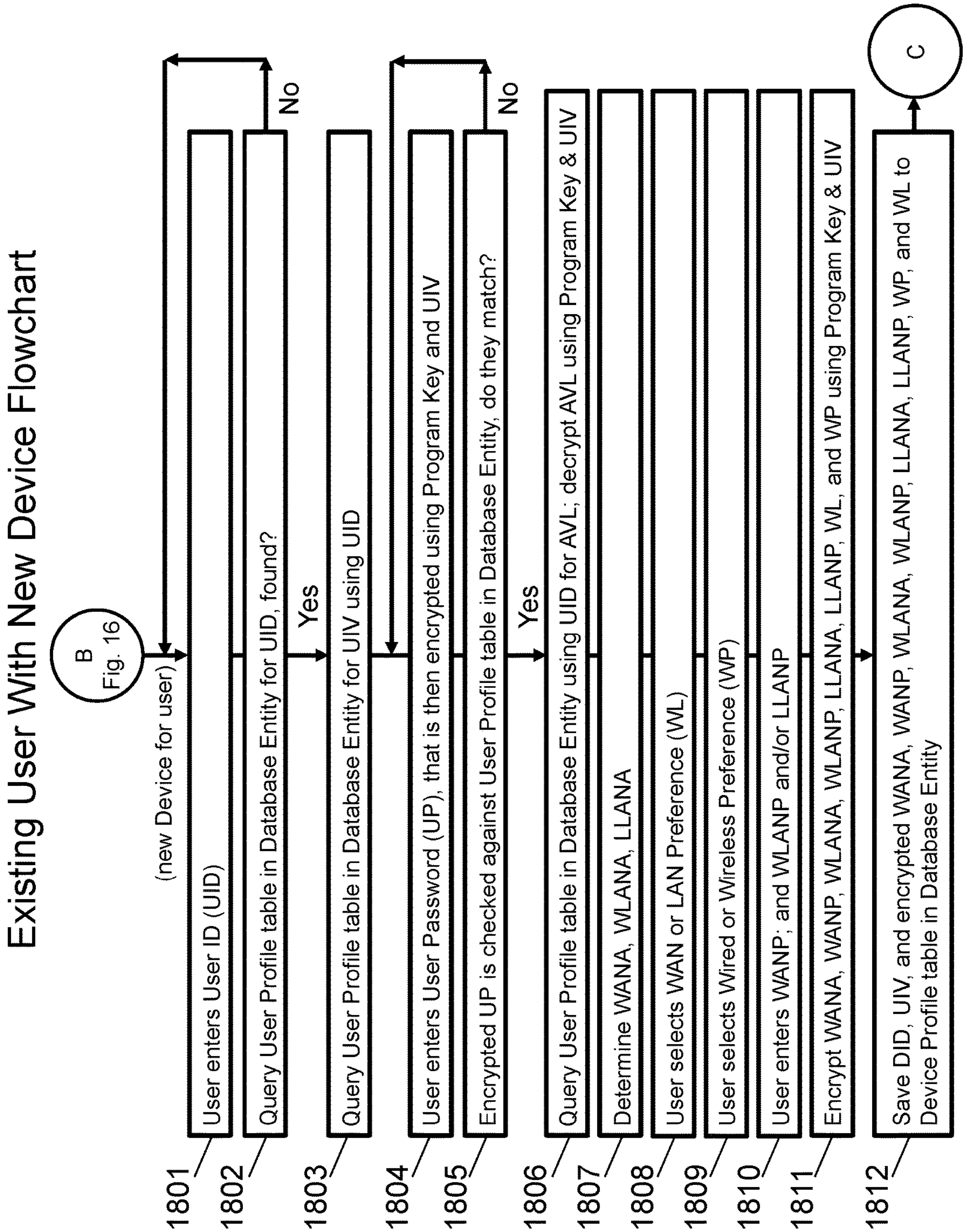
FIG. 18 shows a continuation of the flowchart depicted in FIG. 16 for an existing user with a new Device, retrieving User Profile information, checking user's password, user selecting network preferences, and saving information to user's Device Profile in a Database Entity with continuation on FIG. 17.

FIG. 18 shows a flowchart that continues from FIG. 16 designation B for an existing user with a new Device. The user is prompted to enter 1801 their User ID and the User Profile in the Database Entity is then queried 1802 for such User ID. If the User ID is not found the user is prompted to enter 1801 their User ID again. If the User ID is found, the User Profile table is queried 1803 for the User Encryption Initialization Vector using the User ID. Next the user is prompted to enter 1804 their User Password, which is Encrypted using the Program Key and User Encryption Initialization Vector and compared 1805 to the Encrypted User Password from the User Profile table. If the Encrypted User Passwords don't match, then the user is prompted 1804 to enter their User Password again. If the Encrypted User Passwords do match, then the User Profile table is queried 1806 using the User ID for Availability which is subsequently Decrypted using the Program Key and User Encryption Initialization Vector. The Device's associated Wide Area Network Address, Wired Local Area Network Address, and/or Wireless Local Area Network Address are discovered 1807, if available. The user selects their (i) Wide Area Network or Local Area Network Preference 1808; and (ii) Wired or Wireless Preference 1809. The user then enters 1810 a Wide Area Network Port, Wired Local Area Network Port, and/or Wireless Local Area Network Port. The Wide Area Network Address, Wide Area Network Port, Wired Local Area Network Address, Wired Local Area Network Port, Wireless Local Area Network Address, Wireless Local Area Network Port, Wired or Wireless Preference, and Wide Area Network or Local Area Network Preference are Encrypted 1811 using a Program Key and User Encryption Initialization Vector and saved 1812 along with the unencrypted Device ID and User Encryption Initialization Vector to the Device Profile table in the Database Entity with continuation on FIG. 17.

Figure 19:
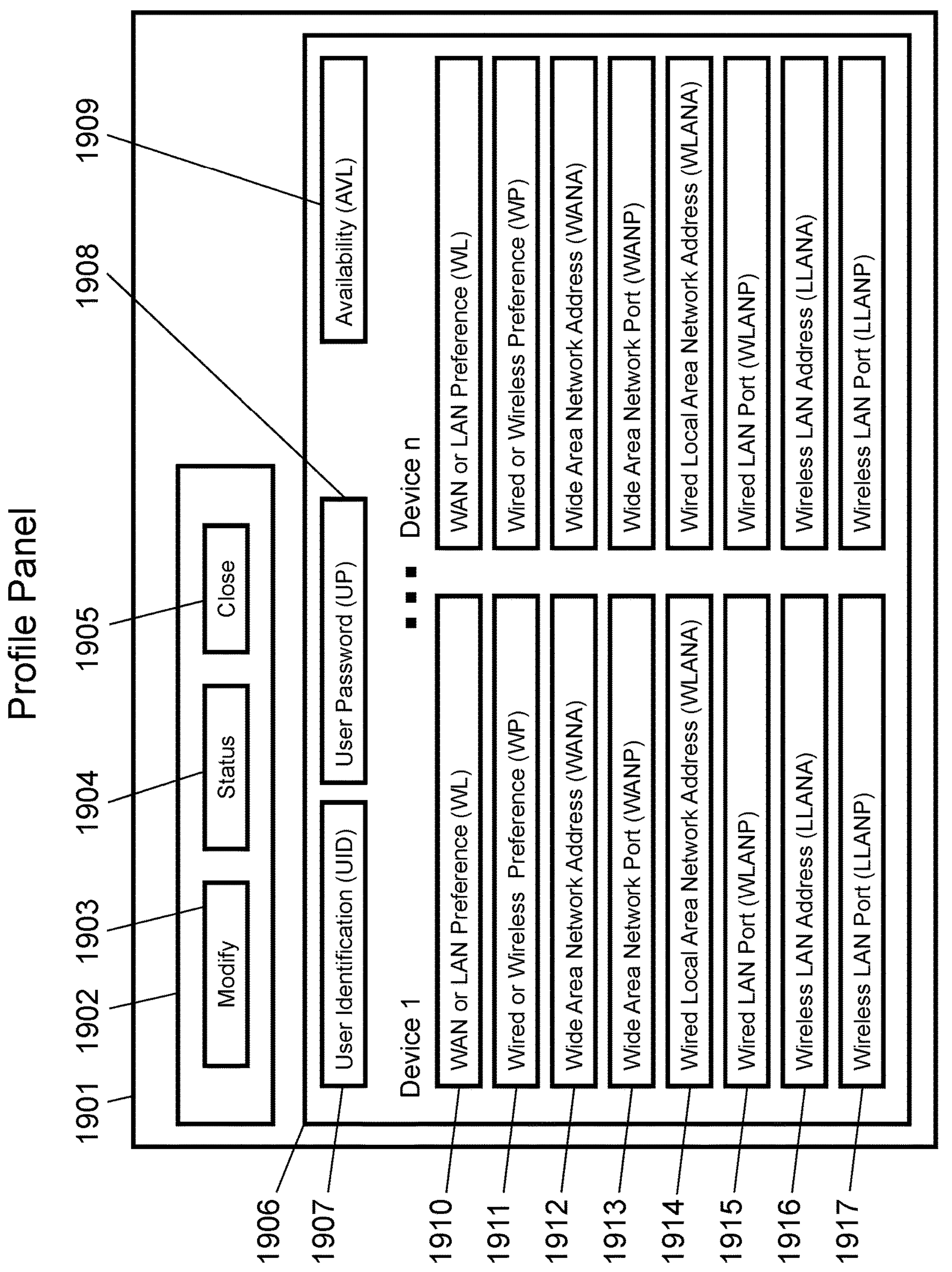
FIG. 19 shows a profile panel for definition, display, and modification of a user's User Profile and Device Profile elements.

FIG. 19 shows a profile panel 1901 for the definition, display, and modification of a User Profile and Device Profile. A portion 1902 of the panel has controls to modify 1903, for status 1904, and to close or hide 1905 the panel 1901. Another portion 1906 of the panel displays the User ID 1907, User Password 1908, and Availability 1909, along with each of the user's Devices Wide Area Network or Local Area Network Preference 1910, Wired or Wireless Preference 1911, Wide Area Network Address 1912, Wide Area Network Port 1913, Wired Local Area Network Address 1914, Wired Local Area Network Port 1915, Wireless Local Area Network Address 1916, and Wireless Local Area Network Port 1917.

Figure 20:
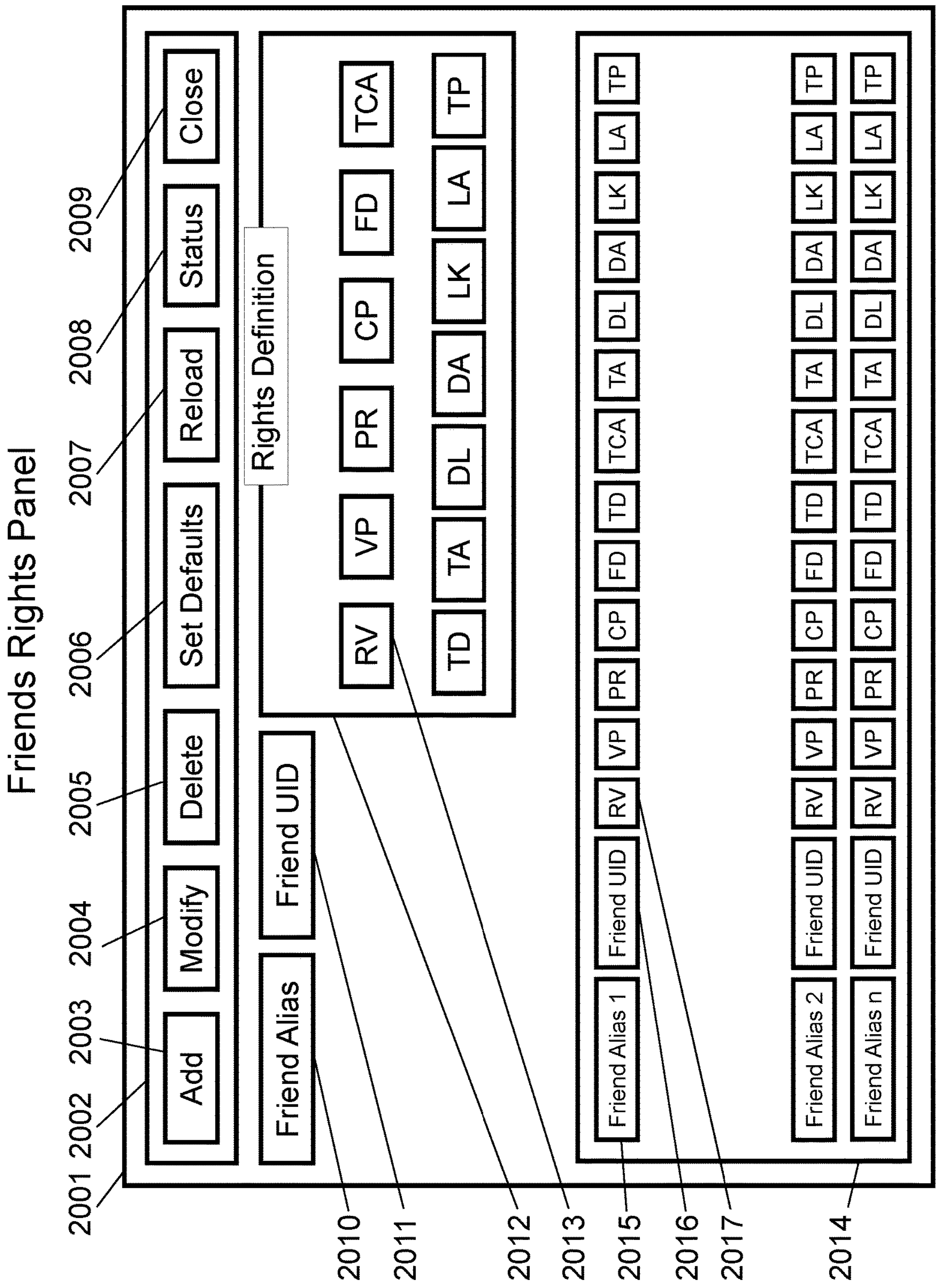
FIG. 20 shows a panel to (i) define, display, add, modify, and delete Friends; and (ii) set and display each Friends Rights.

FIG. 20 shows a Friends Rights panel 2001 with a portion 2002 to (i) add 2003 a Friend; (ii) modify and save 2004 a Friend's alias 2010, User ID 2011, and/or Rights 2012; (iii) delete 2005 a Friend; (iv) set 2006 the default Rights for all new Friends; (v) reload 2007 a Friend's alias 2010 and/or the Friend's Rights 2012 associated with a Friend's User ID, provided such User ID exists; (vi) display status 2008; and (vii) close or hide 2009 the panel 2001. A Friend's alias 2010 and User ID 2011 can be defined and associated Rights selected in portion 2012 of the panel, such as, whether Rights are viewable 2013. These Rights that are set or reset apply to Transfer Components for any future Transfer sent to such Friend. These Rights may also be set 2006 as the default Rights for all new Friends. Another portion 2014 of the panel displays all current Friends with each Friend's alias 2015, User ID 2016, and Rights, such as, the Right to view Rights 2017.

Figure 21:
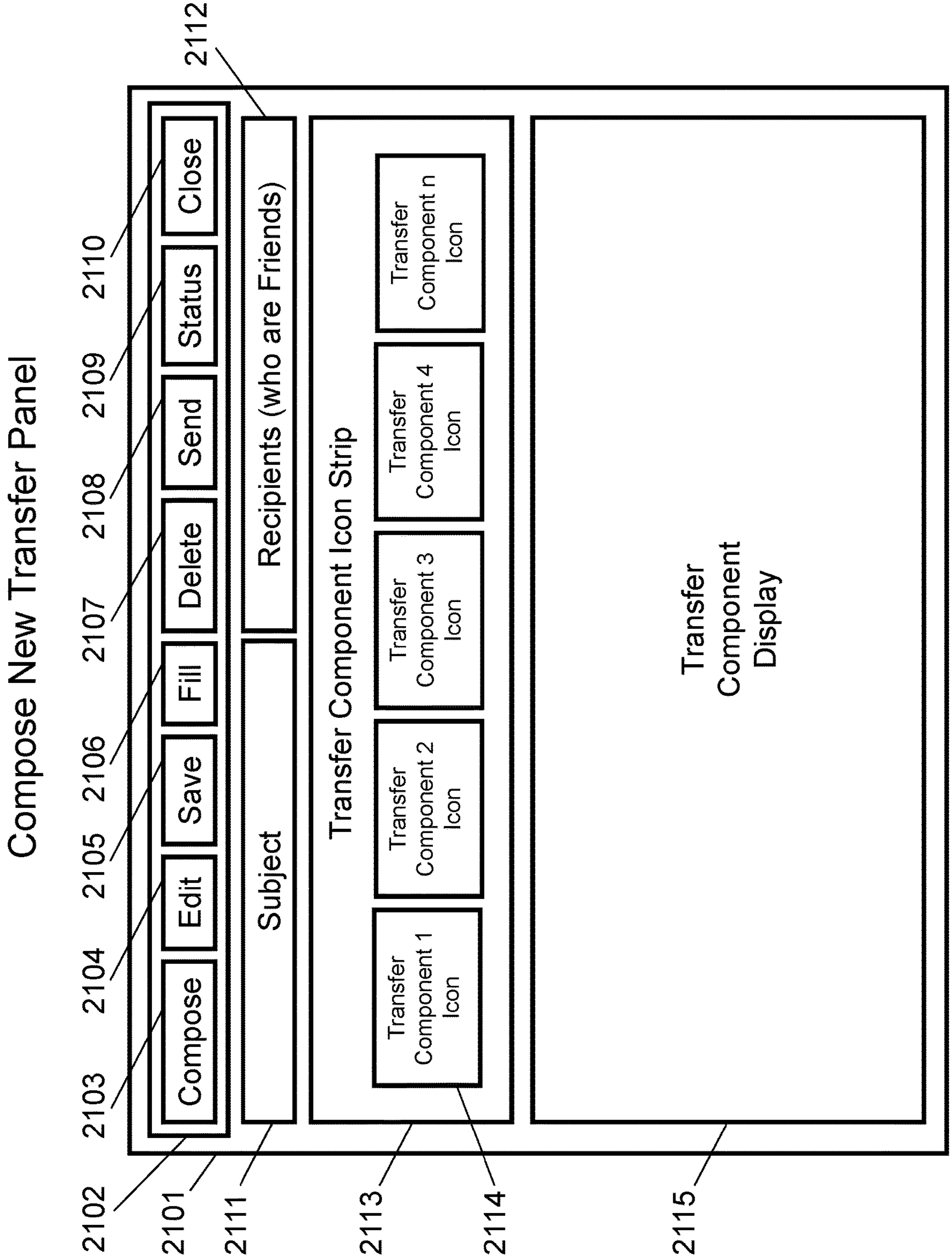
FIG. 21 shows a command and control panel to (i) compose, save, delete, and send a Transfer; and (ii) compose, edit, display, and delete Transfer Components associated with said Transfer.

FIG. 21 shows a panel 2101 for composing a new Transfer or editing an existing Transfer not yet sent. A portion 2115 of the panel is to display and edit a Transfer Component. A portion 2113 of the panel is to display an icon for each Transfer Component in the Transfer being composed or edited, where each icon, such as the first icon 2114 in the Transfer Component icon strip, is stylized to identify the Element it represents and its type. Selecting a Transfer Component icon 2114 will cause the associated Transfer Component to be displayed in the Transfer Component display 2115. A portion 2111 of the panel allows the subject to be edited and a portion 2112 of the panel allows the Transfer Recipients to be selected or added. The portion 2102 of the panel provides controls to (i) compose 2103 a new Transfer; (ii) edit 2104 a Transfer that hasn't been sent; (iii) save 2105 a Transfer; (iv) delete 2107 a Transfer; (v) send 2108 a Transfer; (vi) show 2109 status; (vii) close or hide 2110 the panel 2101; and (viii) toggle fill 2106, that when selected toggles between (i) hiding panel portions 2111, 2112, and 2113 to allow Transfer Component Display 2115 to fill a majority of the panel 2101; and (ii) unhiding panel portions 2111, 2112, and 2113 and the Transfer Component Display 2115 returning to its initial size.

Figure 22:
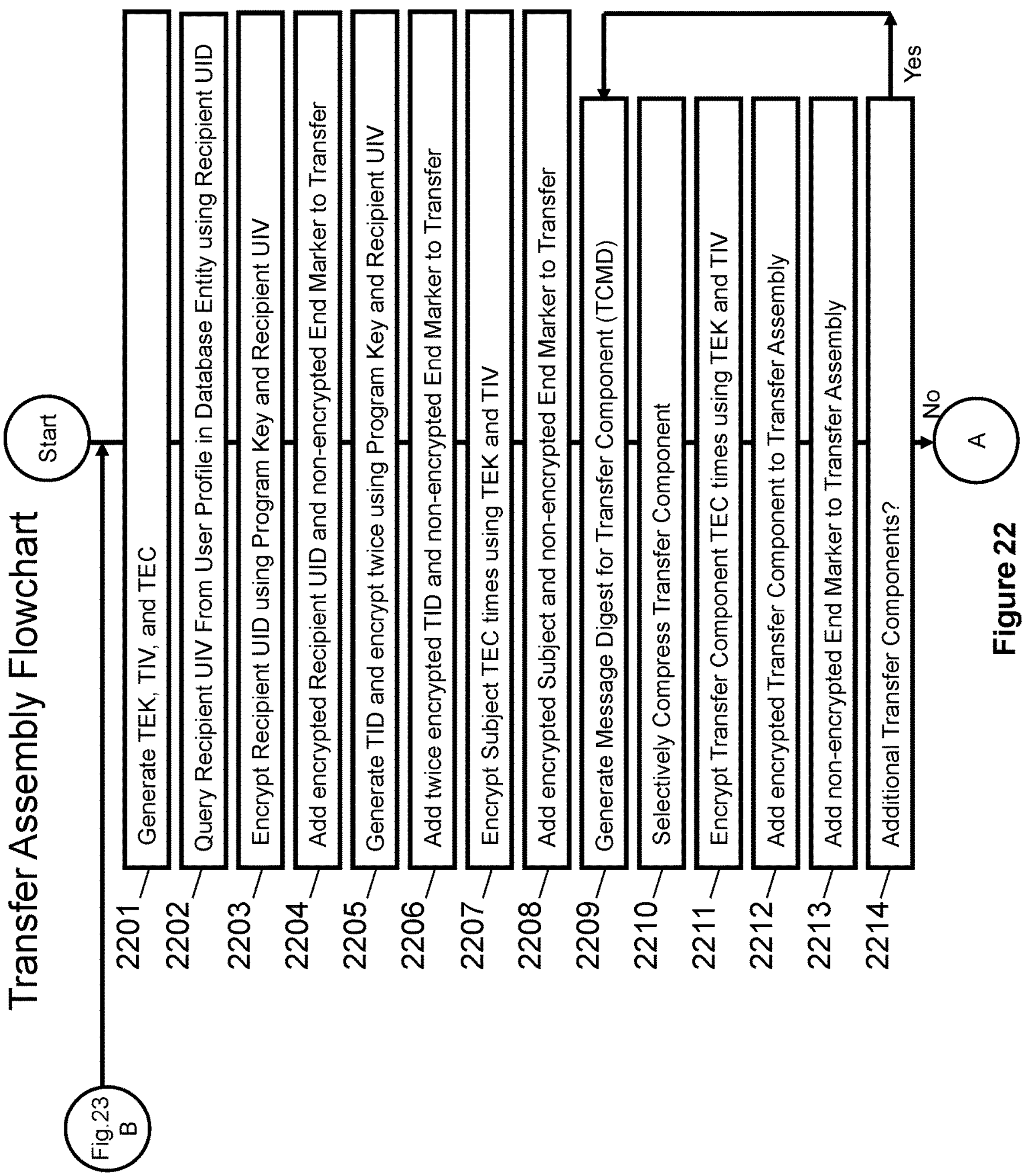
FIG. 22 shows a flowchart of a Transfer being assembled with continuation on FIG. 23.
Figure 23:
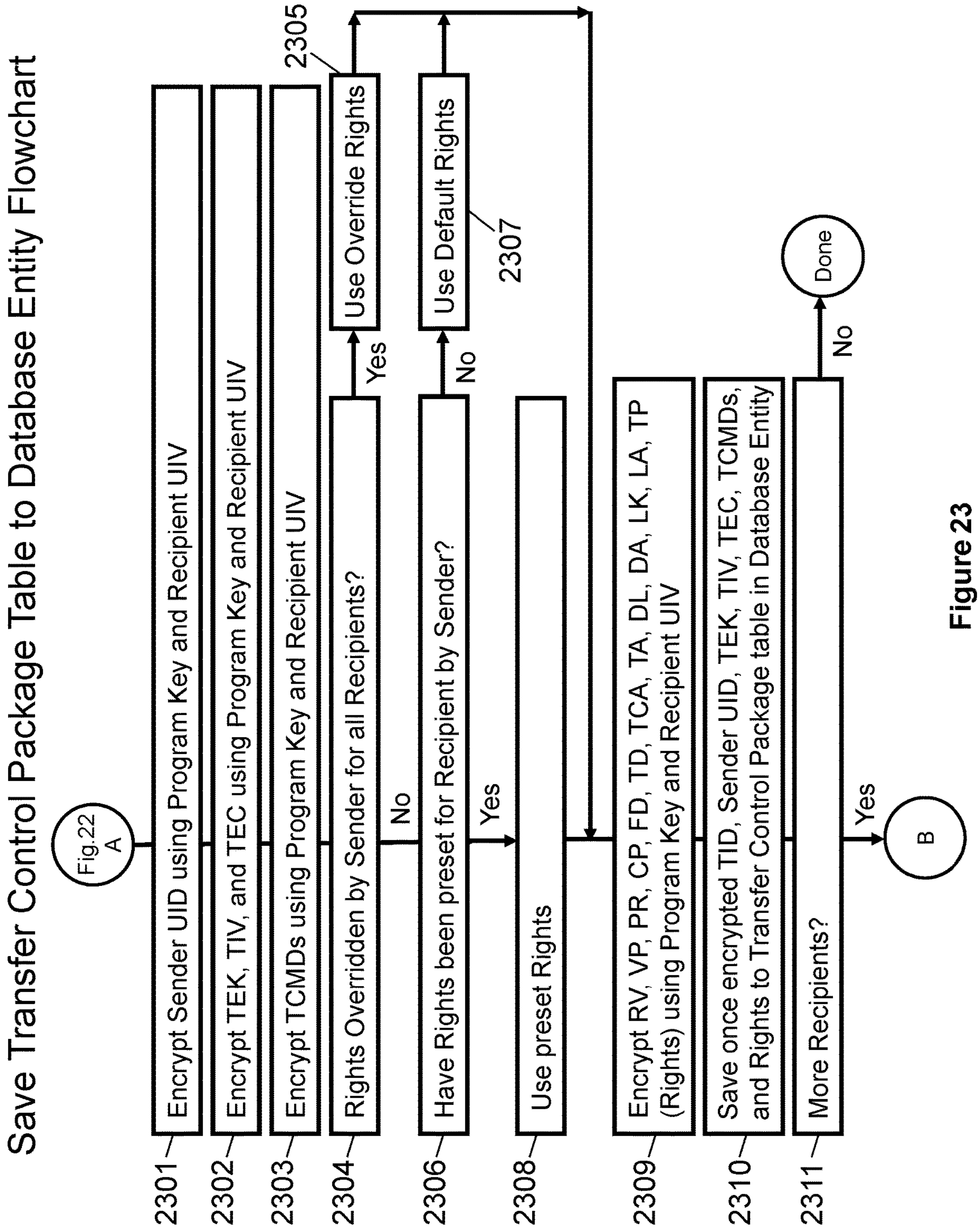
FIG. 23 shows a continuation of the flowchart depicted in FIG. 22 and saving a Transfer Control Package associated with a Transfer to a Transfer Control Package table in a Database Entity.

FIG. 22 shows a flowchart of the Transfer assembly process that continues from FIG. 23 designation B. A Transfer Encryption Key, Transfer Encryption Initialization Vector, and Transfer Encryption Count are generated 2201. Next, a User Profile in a Database Entity is queried 2202 using the intended Transfer Recipient User ID for Recipient User Encryption Initialization Vector. The Recipient User ID is then Encrypted 2203 using the Program Key and Recipient User Encryption Initialization Vector. The resulting Encrypted Recipient User ID and an unencrypted End Marker are added 2204 to the Transfer being assembled. A Transfer ID is generated 2205 and Encrypted twice using the Program Key and Recipient User Encryption Initialization Vector. The twice Encrypted Transfer ID and an unencrypted End Marker are added 2206 to the Transfer being assembled. The subject of the Transfer is Encrypted 2207 the number of times specified by the Transfer Encryption Count using the Transfer Encryption Key and Transfer Encryption Initialization Vector. The Encrypted subject and an unencrypted End Marker are added 2208 to the Transfer being assembled. For each Transfer Component in the Transfer being assembled a Message Digest (i) is generated 2209; (ii) may be compressed 2210; (iii) is Encrypted 2211 the number of times specified by Transfer Encryption Count using the Transfer Encryption Key and Transfer Encryption Initialization Vector; (iv) is added 2212 to the Transfer along with an unencrypted End Marker 2213. If there are additional Transfer Components 2214, the cycle repeats 2209, otherwise the flowchart continues on FIG. 23.

FIG. 23 shows a flowchart that continues from FIG. 22 designation A. The Sender User ID is Encrypted 2301 using the Program Key and Recipient User Encryption Initialization Vector. The Transfer Encryption Key, Transfer Encryption Initialization Vector, and Transfer Encryption Count are then Encrypted 2302 using the Program Key and Recipient User Encryption Initialization Vector. Each Transfer Component Message Digest is Encrypted 2303 using the Program Key and the Recipient User Encryption Initialization Vector. If Rights have been overridden 2304 by Sender for all Recipients, then use such overridden Rights 2305. If Rights have not been overridden 2304, then check if Rights have been preset 2306 for Recipient by Sender. If Rights have not been preset 2306, then use default Rights 2307, otherwise use preset Rights 2308. Encrypt 2309 Rights using the Program Key and Recipient User Encryption Initialization Vector. The Transfer ID, Sender User ID, Transfer Encryption Key, Transfer Encryption Initialization Vector, Transfer Encryption Count, Transfer Component Message Digests, and Rights as previously Encrypted are saved 2310 to a Transfer Control Package table in the Database Entity. If there are no more Recipients 2311 then the process is done, otherwise the process continues on FIG. 22.

Figure 24:
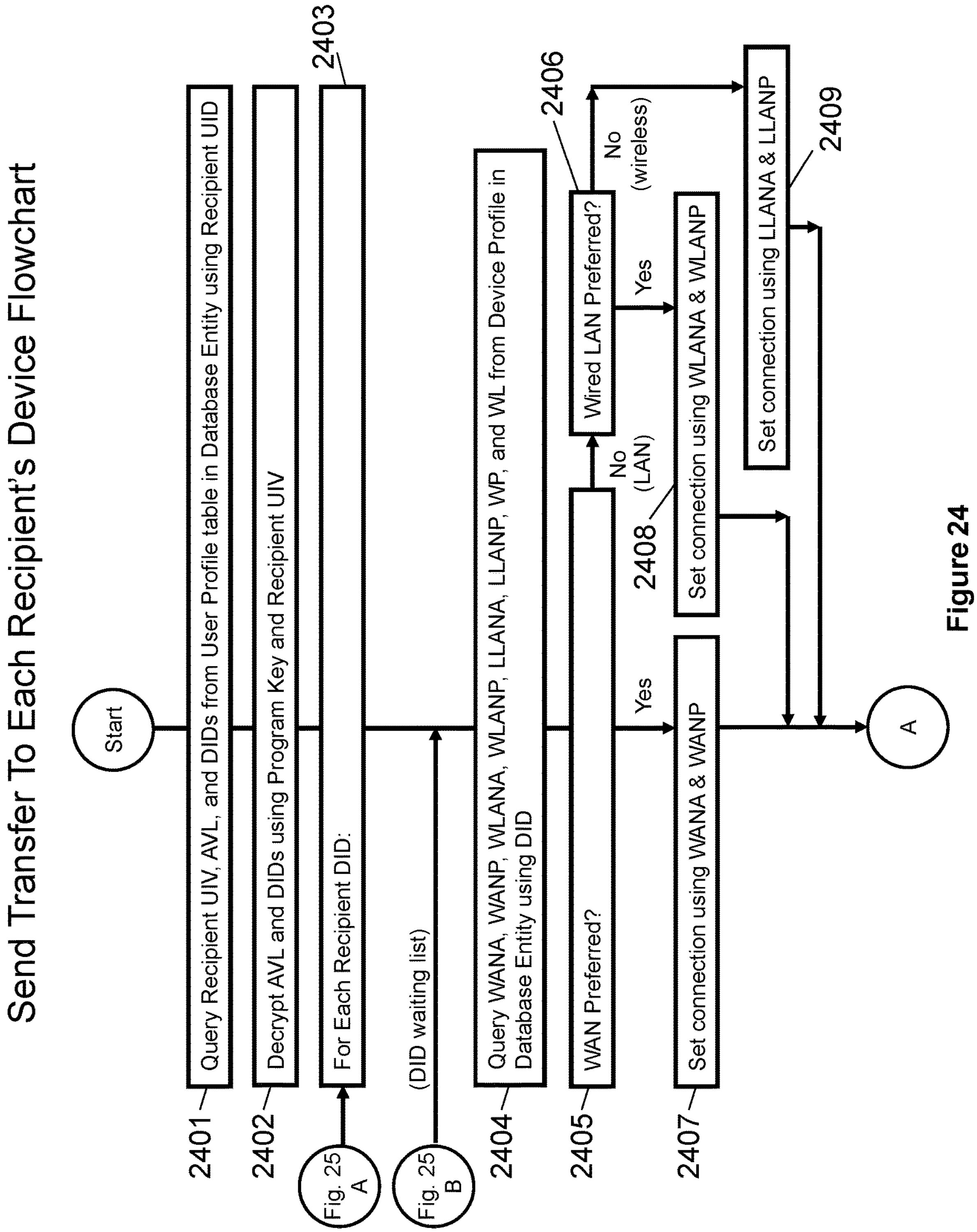
FIG. 24 shows a flowchart for an RCCP initiating a Transfer to a Recipient's Device, only when Recipient is available according Recipient's User Profile with continuation on FIG. 25.

FIG. 24 shows a flowchart for initiating a Transfer to each Recipient Device. The Recipient User Encryption Initialization Vector, Availability, and Device IDs from a User Profile table in a Database Entity are queried 2401 using the Recipient User ID. The Availability and Device IDs are Decrypted 2402 using the Program Key and Recipient User Encryption Initialization Vector. For each Recipient Device ID 2403, with continuation from FIG. 25 designation A and continuation from FIG. 25 designation B for Recipients that are on the waiting list, a Device Profile in a Database Entity is queried 2404 using such Device ID for Wide Area Network Address, Wide Area Network Port, Wired Local Area Network Address, Wired Local Area Network Port, Wireless Local Area Network Address, Wireless Local Area Network Port, Wired or Wireless Preference, and Wide Area Network or Local Area Network Preference. If Wide Area Network is preferred 2405 then the connection is set 2407 using the Wide Area Network Address and Wide Area Network Port with continuation on FIG. 25. If Wide Area Network is not preferred 2405 and Wired Local Area Network is preferred 2406, then the connection is set 2408 using the Wired Local Area Network Address and Wired Local Area Network Port with continuation on FIG. 25. If Wide Area Network is not preferred 2405 and Wired Local Area Network is not preferred 2406, then the connection is set 2409 using the Wireless Local Area Network Address and Wireless Local Area Network Port with continuation on FIG. 25.

Figure 25:
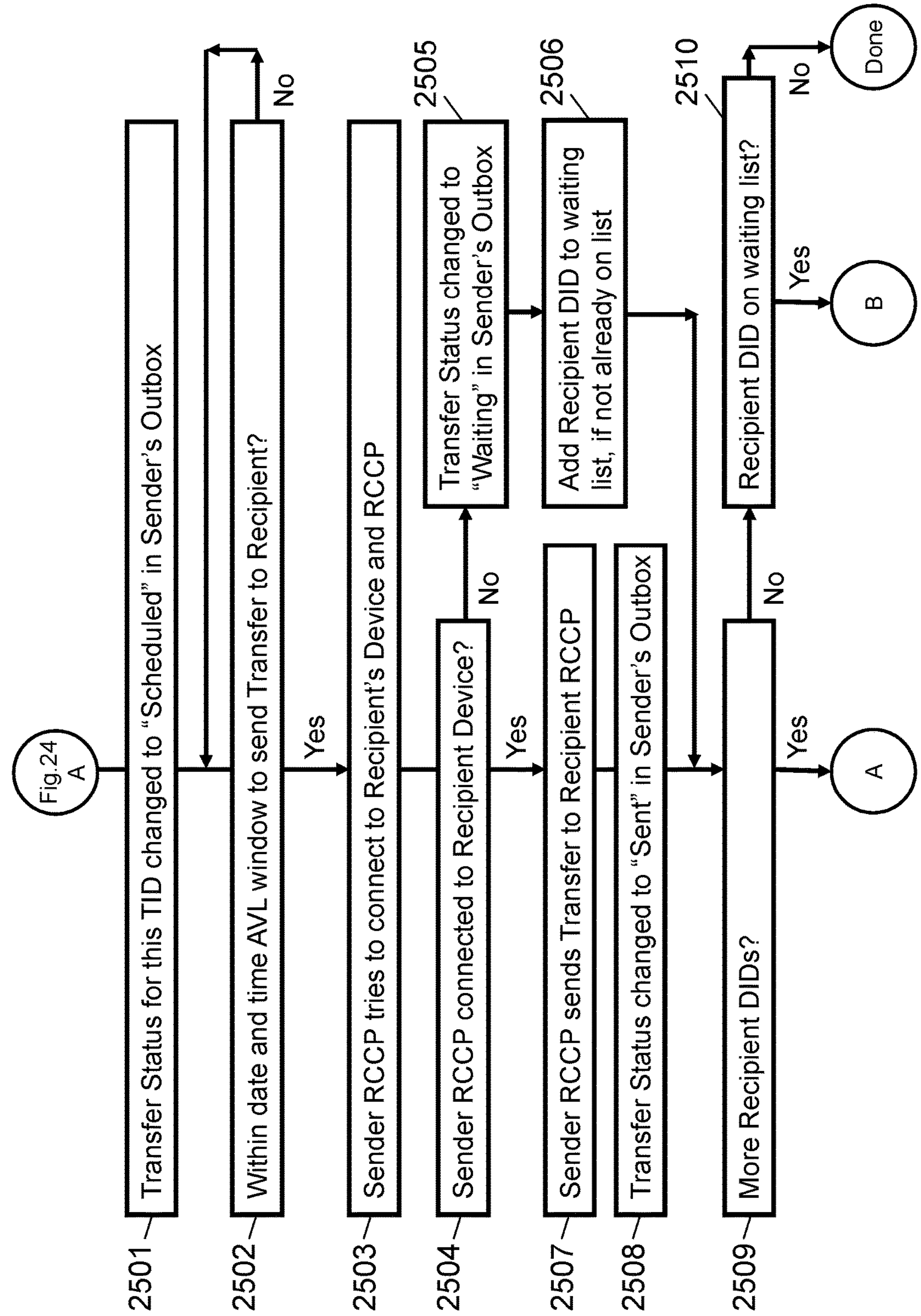
FIG. 25 shows a continuation of the flowchart depicted in FIG. 24 and an RCCP sending a Transfer to a Recipient Device or queuing the Transfer for later delivery with continuation on FIG. 24 for additional Recipient Devices.

FIG. 25 shows a flowchart that continues from FIG. 24 designation A. The Transfer Status for this Transfer ID is changed 2501 to "Scheduled" in the Sender outbox. The date and time are checked to be in the Recipient Availability window 2502 for Recipient to receive a Transfer from Sender. If within such Availability window 2502, the Sender RCCP tries 2503 to connect to Recipient Device and RCCP operating on such Device, otherwise the Sender RCCP waits until within such Availability window 2502. If the Sender RCCP successfully connects 2504 to Recipient Device and Recipient RCCP, the Sender RCCP sends 2507 the Transfer to Recipient RCCP and the Transfer Status is changed 2508 to "Sent" in Sender Outbox. If there are any additional Recipient Device IDs 2509 the process continues on FIG. 24. If connecting 2504 to Recipient Device and Recipient RCCP are not successful then Transfer Status is changed 2505 to "Waiting" in Sender outbox and the Recipient Device ID is added 2506 to a waiting list, if such Device ID is not already on the waiting list. If there are any additional Recipient Device IDs 2509, then the process continues on FIG. 24. If there are no additional Recipient Device IDs 2509 and the Recipient Device ID 2510 is not on the waiting list, then the process is done. If there are no additional Recipient Device IDs 2509 and the Recipient Device ID 2510 is on the waiting list, then the process continues on FIG. 24.

Figure 26:
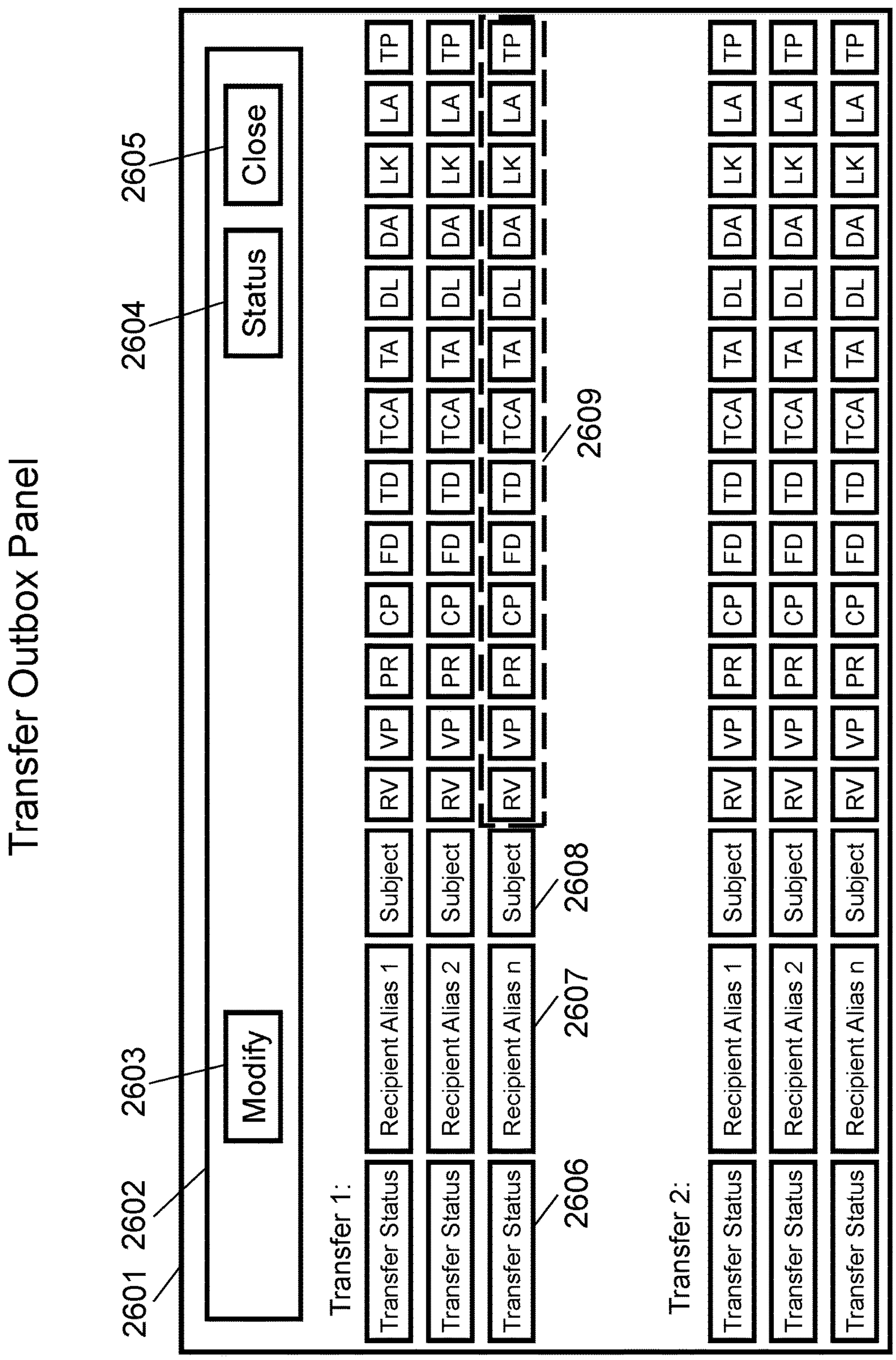
FIG. 26 shows a panel for outgoing or sent Transfers and the associated Rights for each Transfer with a control to modify the Rights for selected Transfers.

FIG. 26 shows a panel 2601 for outgoing or sent Transfers. A portion 2602 of the panel contains controls to (i) modify 2603 the Rights 2609 for selected Transfers; (ii) display status 2604; and (iii) close or hide 2605 the panel 2601. For each Transfer the (i) Transfer Status 2606 indicating if the Transfer has been "Scheduled", "Sent", or is "Waiting"; (ii) alias or friendly name of the Recipient 2607; (iii) subject 2608 of the Transfer; and (iv) associated Rights 2609 are listed in the panel 2601.

Figure 27:
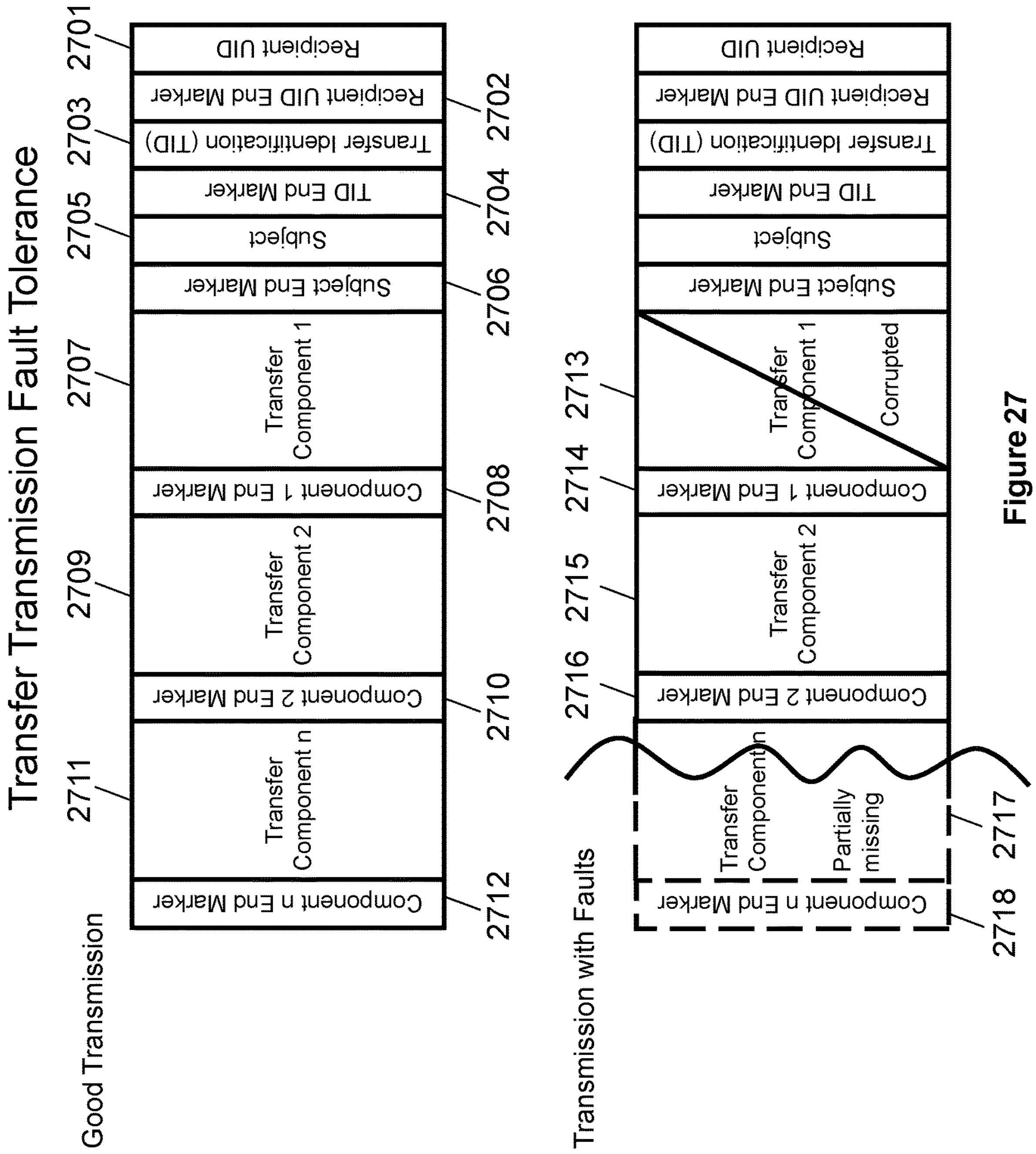
FIG. 27 shows the components of a Transfer during a good transmission from Sender to Recipient and similarly during one permutation of a faulty transmission.

FIG. 27 shows the components of an example Transfer during a good transmission from Sender to Recipient including the Recipient User ID 2701 and its End Marker 2702, Transfer ID 2703 and its End Marker 2704, subject 2705 and its End Marker 2706, a first Transfer Component 2707 and its End Marker 2708, a second Transfer Component 2709 and its End Marker 2710, and a last Transfer Component 2711 and its End Marker 2712. One permutation of a faulty transmission is shown with the corrupted first Transfer Component 2713 and its End Marker 2714, the second Transfer Component 2715 and its End Marker 2716, and the last Transfer Component 2717 that was partially transmitted and its End Marker 2718. Corrupted, incomplete, or otherwise modified Transfer Components will be discarded, as their Transfer Component Message Digests won't match before and after transmission, while other unmodified Transfer Components, such as the second Transfer Component 2715 will be read and displayed successfully.

Figure 28:
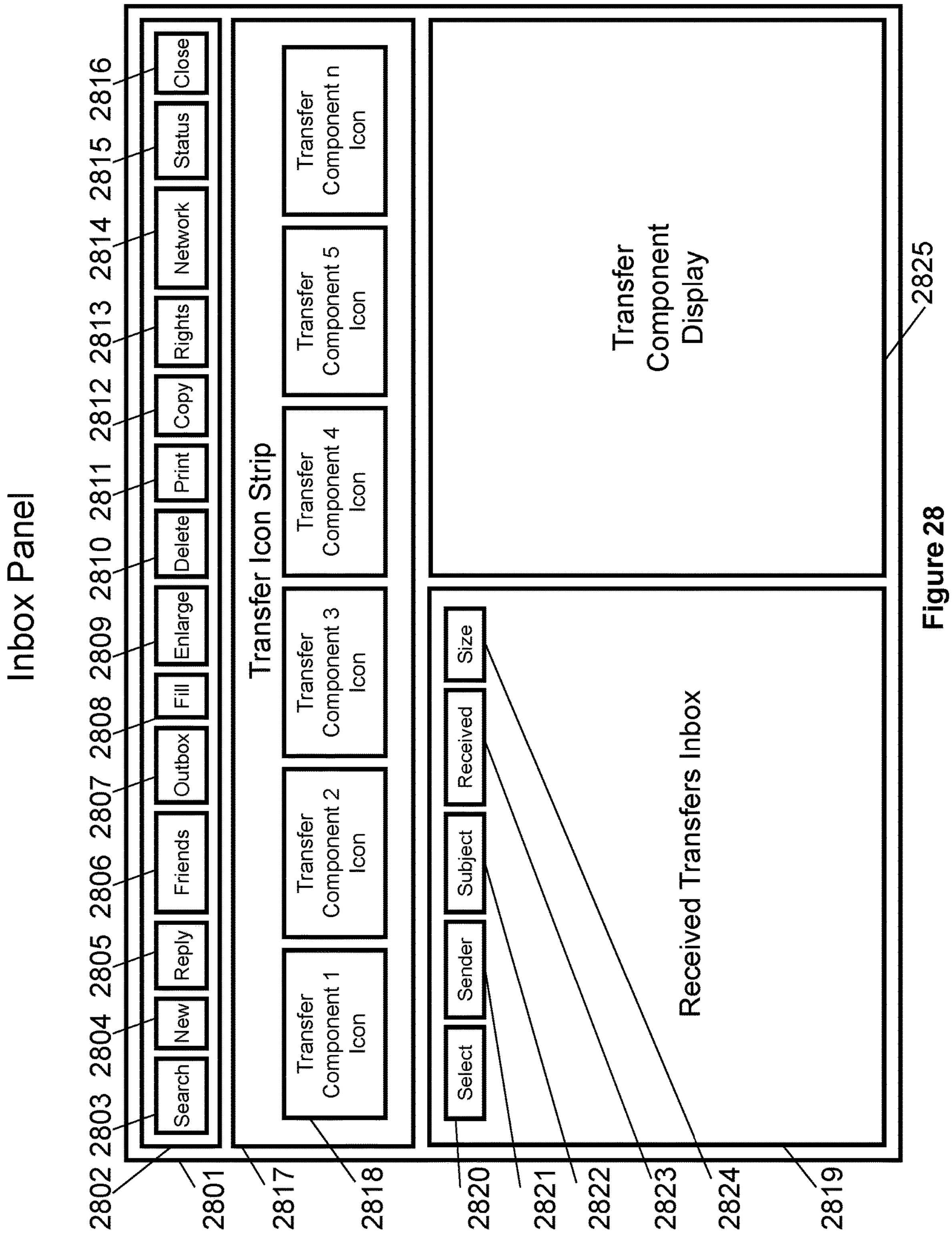
FIG. 28 shows a command, control, and status panel with controls to display and take action on received Transfers and Transfer Components.

FIG. 28 shows a panel 2801 for received Transfers with a portion 2802 for controls to (i) search 2803 for particular Transfers matching search criteria; (ii) compose 2804 a Transfer; (iii) reply 2805 to the currently selected Transfer; (iv) open 2806 Friends Rights panel; (v) open 2807 Transfer outbox panel; (vi) toggle fill 2808 when selected to hide panel portions 2817 and 2819 to allow the Transfer Component Display 2825 to fill a majority of the panel 2801 or unhide panel portions 2817 and 2819 with the Transfer Component Display 2825 returning to its initial size; (vii) enlarge 2809 the Transfer Component being displayed in the Transfer Component display 2825 by a percentage of the Transfer Component size each time enlarge 2809 is selected or a computer mouse wheel advances for a mouse that is hovering over enlarge 2809 until a maximum is exceeded and then the Transfer Component will return to its initial size and if the mouse wheel is reversed the Transfer Component being displayed in the Transfer Component display 2825 will be reduced by a percentage until a minimum is exceeded and then the Transfer Component will return to its initial size; (viii) delete 2810 the currently selected Transfer; (ix) print 2811 as applicable the Transfer Component being displayed; (x) copy 2812 the currently selected Transfer or currently displayed Transfer Component; (xi) display 2813 the Rights for the currently selected Transfer; (xii) display 2814 network parameters; (xiii) display status 2815; and (xiv) close or hide 2816 the panel 2801. There is a portion 2817 of the panel 2801 that is a Transfer icon strip that displays an icon for each Transfer Component for the currently selected Transfer. When an icon is selected, the icon will highlight and the associated Transfer Component will be displayed in the Transfer Component display 2825. The first Transfer Component icon 2818 in the Transfer icon strip 2817 is the icon for the first Transfer Component of the currently selected Transfer. When a computer mouse hovers over Transfer icon strip 2817 and the mouse wheel is advanced or mouse clicked, each icon will be selected for each subsequent mouse wheel advancement or mouse click and after the last icon the first icon will be selected. When the mouse wheel is reversed the icons will be selected in reverse order and after the first icon the last icon will be selected. Another portion 2819 of the panel 2801 shows pertinent information for received Transfers including the Sender 2821, subject 2822, when received 2823, and the size 2824. Each Transfer can be selected 2820, causing (i) an icon for each Transfer Component of the Transfer to be displayed in the Transfer icon strip 2817; (ii) the first icon highlighted 2818; and (iii) the first Transfer Component displayed in the Transfer Component display 2825.

Figure 29:
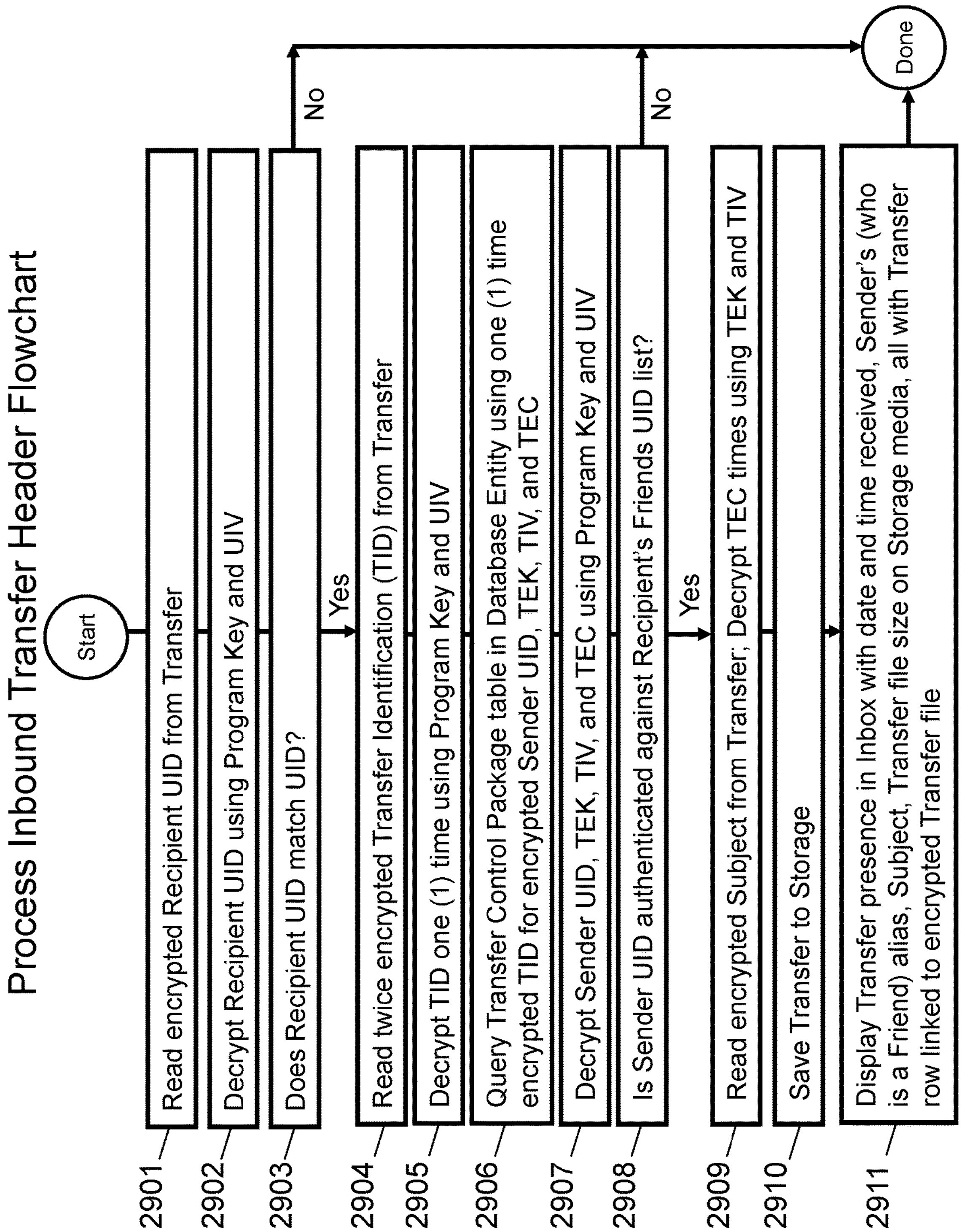
FIG. 29 shows a flowchart of RCCP processing a Transfer Header for an incoming Transfer.

FIG. 29 shows a flowchart for processing a Transfer Header for an incoming Transfer. The Encrypted Recipient User ID is read 2901 from the Transfer and then Decrypted 2902 using the Program Key and User Encryption Initialization Vector. If the Decrypted Recipient User ID from the Transfer does not match 2903 the Recipient User ID then the process is done, otherwise the twice Encrypted Transfer ID is read 2904 from the Transfer and Decrypted 2905 one-time using the Program Key and User Encryption Initialization Vector, resulting in a one-time Encrypted Transfer ID. Next, a Transfer Control Package table in a Database Entity is queried 2906 using the one-time Encrypted Transfer ID for the Encrypted Sender User ID, Transfer Encryption Key, Transfer Encryption Initialization Vector, and Transfer Encryption Count, which are Decrypted 2907 using the Program Key and User Encryption Initialization Vector. If Sender User ID is not authenticated 2908 against Recipient Friends User ID list, then the process is done, otherwise read the Encrypted subject from the Transfer and Decrypt 2909 the number of times specified by the Transfer Encryption Count using the Transfer Encryption Key and Transfer Encryption Initialization Vector. The Transfer is now saved 2910 to Storage and its presence is displayed 2911 in the Recipient inbox with the (i) date and time received; (ii) Sender (who is a Friend) alias; (iii) subject; and (iv) Transfer file size on Storage media, and all linked to the associated Encrypted Transfer file on Storage after which the process is done.

Figure 30:
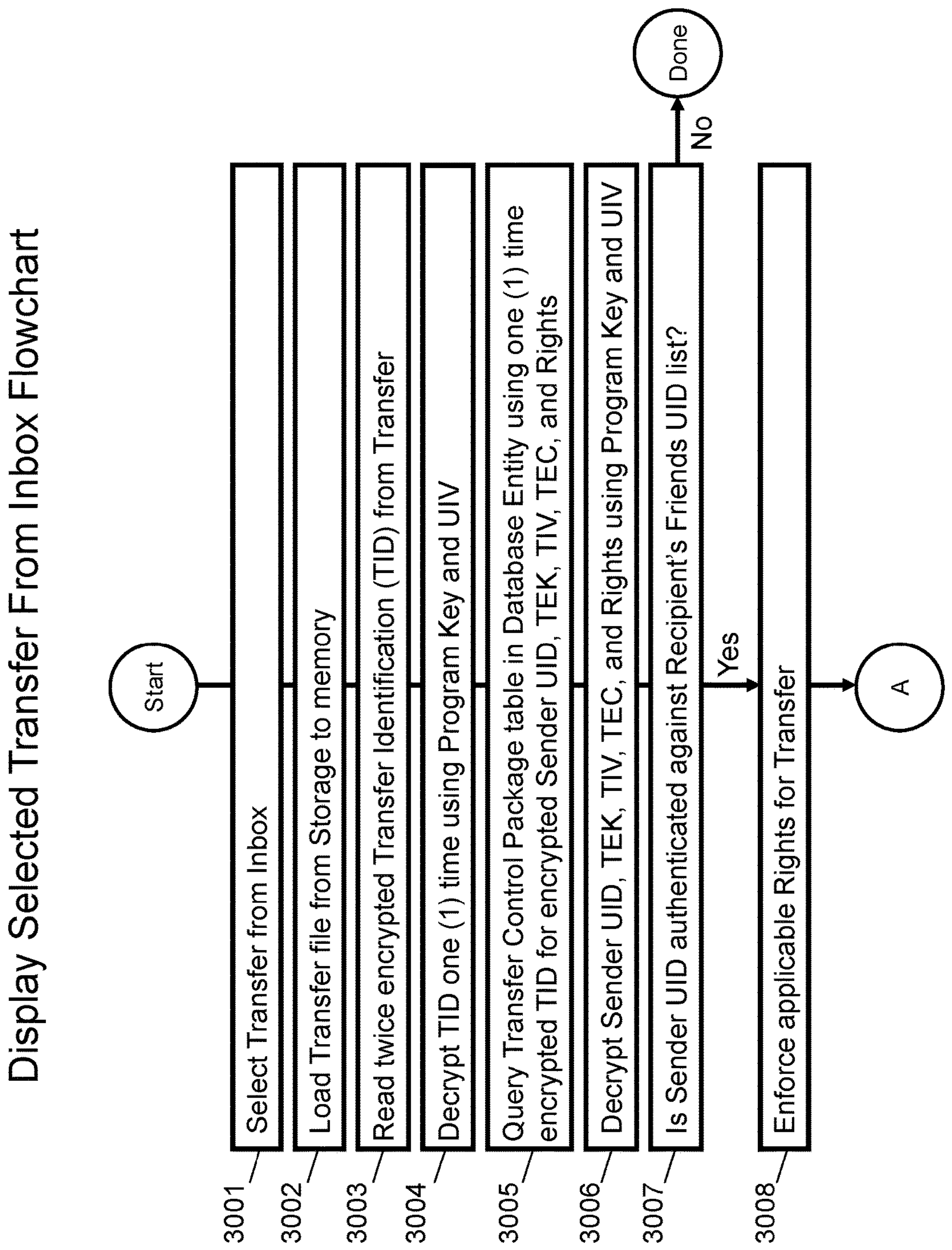
FIG. 30 shows a flowchart of RCCP enforcing the Rights associated with a Transfer, after a Transfer has been selected for display and the Sender's User Identification has been confirmed as a Friend with continuation on FIG. 31.

FIG. 30 shows a flowchart of Rights being enforced for a Transfer, after a Transfer is selected 3001 from an inbox. The Transfer file is loaded 3002 from Storage into memory and the twice Encrypted Transfer ID is read 3003 from the Transfer and Decrypted 3004 one-time using the Program Key and User Encryption Initialization Vector, resulting in a one-time Encrypted Transfer ID. The Transfer Control Package table in a Database Entity is queried 3005 using the one-time Encrypted Transfer ID for the Encrypted Sender User ID, Transfer Encryption Key, Transfer Encryption Initialization Vector, Transfer Encryption Count, and Rights, which are then Decrypted 3006 using the Program Key and Recipient User Encryption Initialization Vector. If the Sender User ID is not authenticated 3007 against Recipient Friends User ID list then the process is done, otherwise the Rights associated with the Transfer are enforced 3008 and the process continues on FIG. 31.

Figure 31:
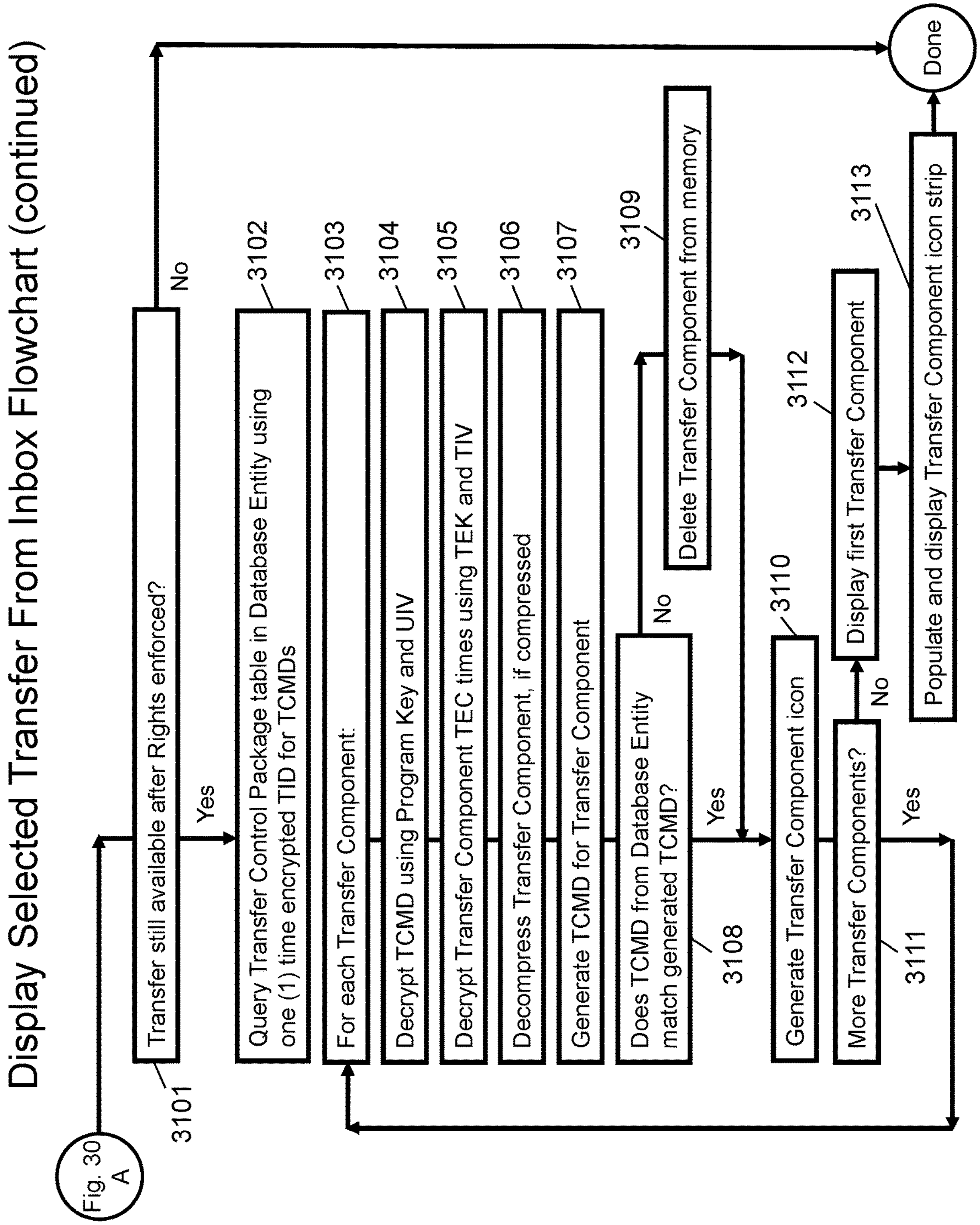
FIG. 31 shows a continuation of the flowchart depicted in FIG. 30 with RCCP decrypting each Transfer Component, confirming each Transfer Component's integrity, and displaying the first Transfer Component.

FIG. 31 shows a flowchart that continues from FIG. 30 designation A. If after the Rights associated with the Transfer have been enforced and subsequently the Transfer is no longer available 3101, then the process is done. Otherwise, if the Transfer is available, then the Transfer Control Package table in the Database Entity is queried 3102 using the one-time Encrypted Transfer ID for the Transfer Component Message Digests associated with Transfer Components of the Transfer. For each Transfer Component 3103 (i) the associated Transfer Component Message Digest is Decrypted 3104 using the Program Key and Recipient User Encryption Initialization Vector; (ii) it is Decrypted 3105 the number of times specified by the Transfer Encryption Count using the Transfer Encryption Key and Transfer Encryption Initialization Vector; (iii) it is decompressed 3106, if compressed; and (iv) a Transfer Component Message Digest is generated 3107 for such Transfer Component. If the Decrypted Transfer Component Message Digest from the Transfer Control Package does not match 3108 the generated Transfer Component Message Digest 3107, then such Transfer Component is deleted 3109 from memory and a "bad" Transfer Component icon is generated 3110. Otherwise, if there is a match 3108, then a Transfer Component icon is generated 3110. If there are no more 3111 Transfer Components in the Transfer, then the first Transfer Component is displayed 3112 and the Transfer Component icon strip is populated with an icon representing each Transfer Component and such icons are displayed 3113 with the first icon in the Transfer Component icon strip being highlighted and the process is done. If there are more 3111 Transfer Components in the Transfer, then the process continues 3103 for the next Transfer Component.

Figure 32:
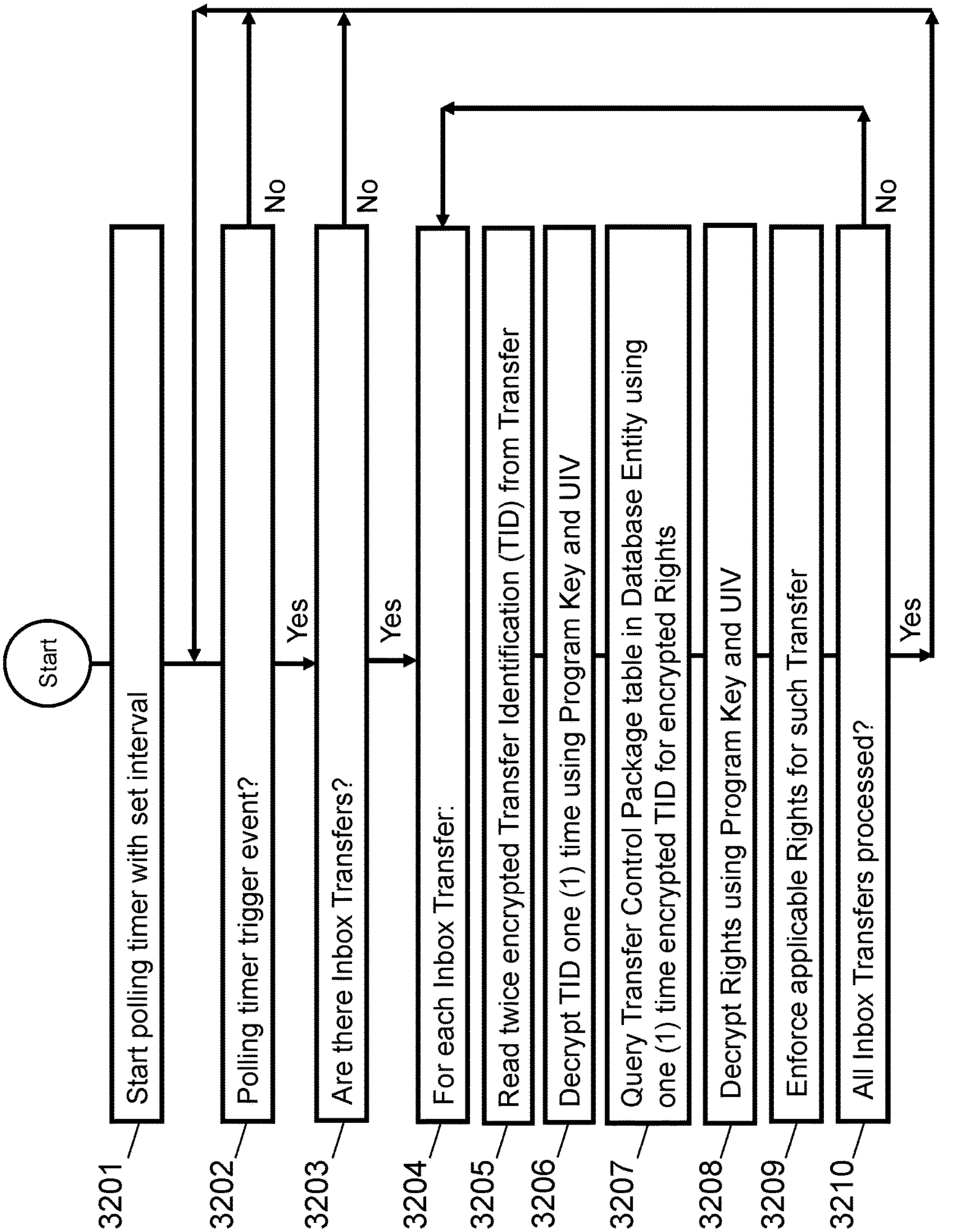
FIG. 32 shows a flowchart of RCCP on a periodic basis retrieving the Rights associated with each Transfer that is in a Recipient's inbox and enforcing applicable Rights.

FIG. 32 shows a flowchart for enforcing Rights after a polling timer trigger event. The polling timer is started 3201 with a set interval and if there is not a polling timer trigger event 3202, then wait for such event. If there is a polling timer trigger event 3202 then the Recipient inbox is checked for Transfers 3203. If there are no Transfers 3203 in the inbox, then the process continues to wait for a polling timer trigger event 3202. If the inbox does have Transfers 3203, then for each Transfer 3204 (i) read 3205 the twice Encrypted Transfer ID from Transfer; (ii) Decrypt 3206 the twice Encrypted Transfer ID one-time using the Program Key and User Encryption Initialization Vector that results in a one-time Encrypted Transfer ID; (iii) query 3207 a Transfer Control Package table in a Database Entity using the one-time Encrypted Transfer ID for Encrypted Rights; (iv) Decrypt 3208 Rights using the Program Key and Recipient User Encryption Initialization Vector; and (v) enforced 3209 Rights for such Transfer as applicable. If all inbox Transfers have not been processed 3210, then the process continues for the next inbox Transfer 3204, otherwise wait for a polling timer trigger event 3202.

Figure 33:
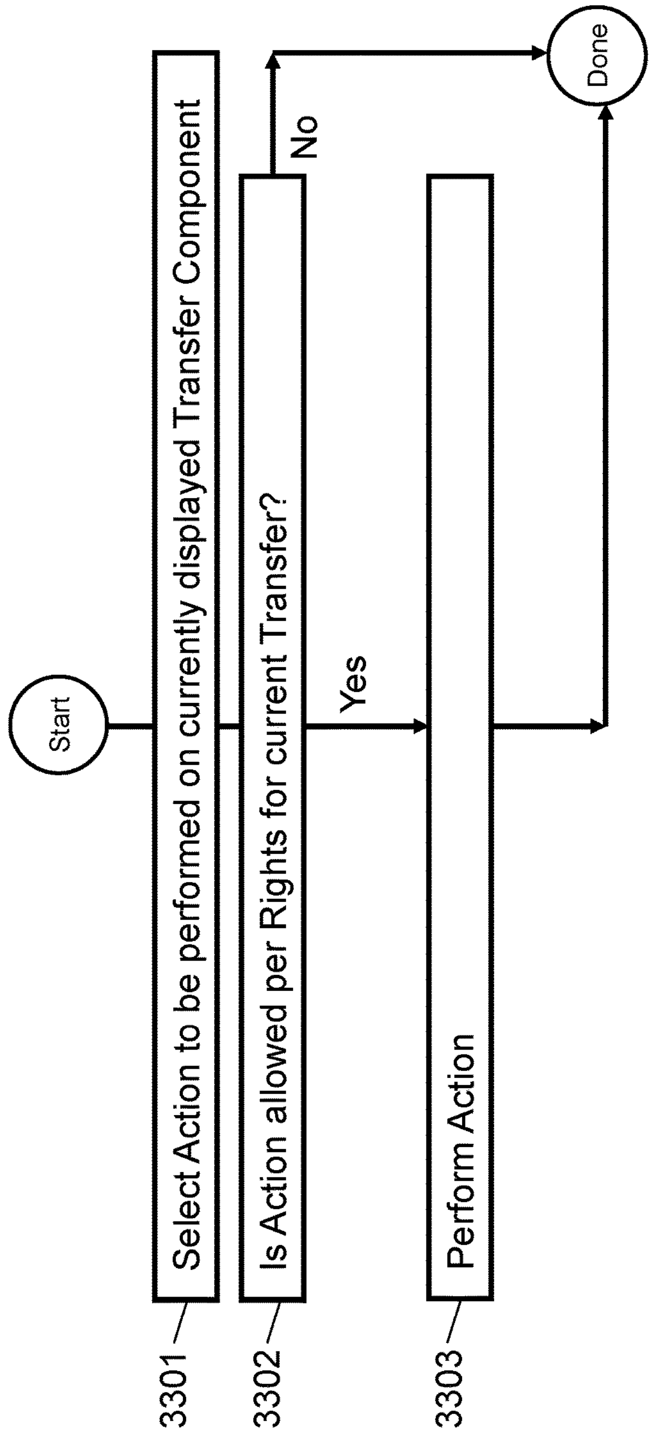
FIG. 33 shows a flowchart of RCCP enforcing applicable Rights on a currently displayed Transfer Component, after an Action has been selected to be performed on such Transfer Component.

FIG. 33 shows a flowchart where an Action has been selected 3301 to be performed on the currently displayed Transfer Component and the Action is checked against the Rights for the current Transfer. If the Action is not allowed 3302 per such Rights then the process is done, otherwise the Action is performed 3303 and the process is done.

Figure 34:
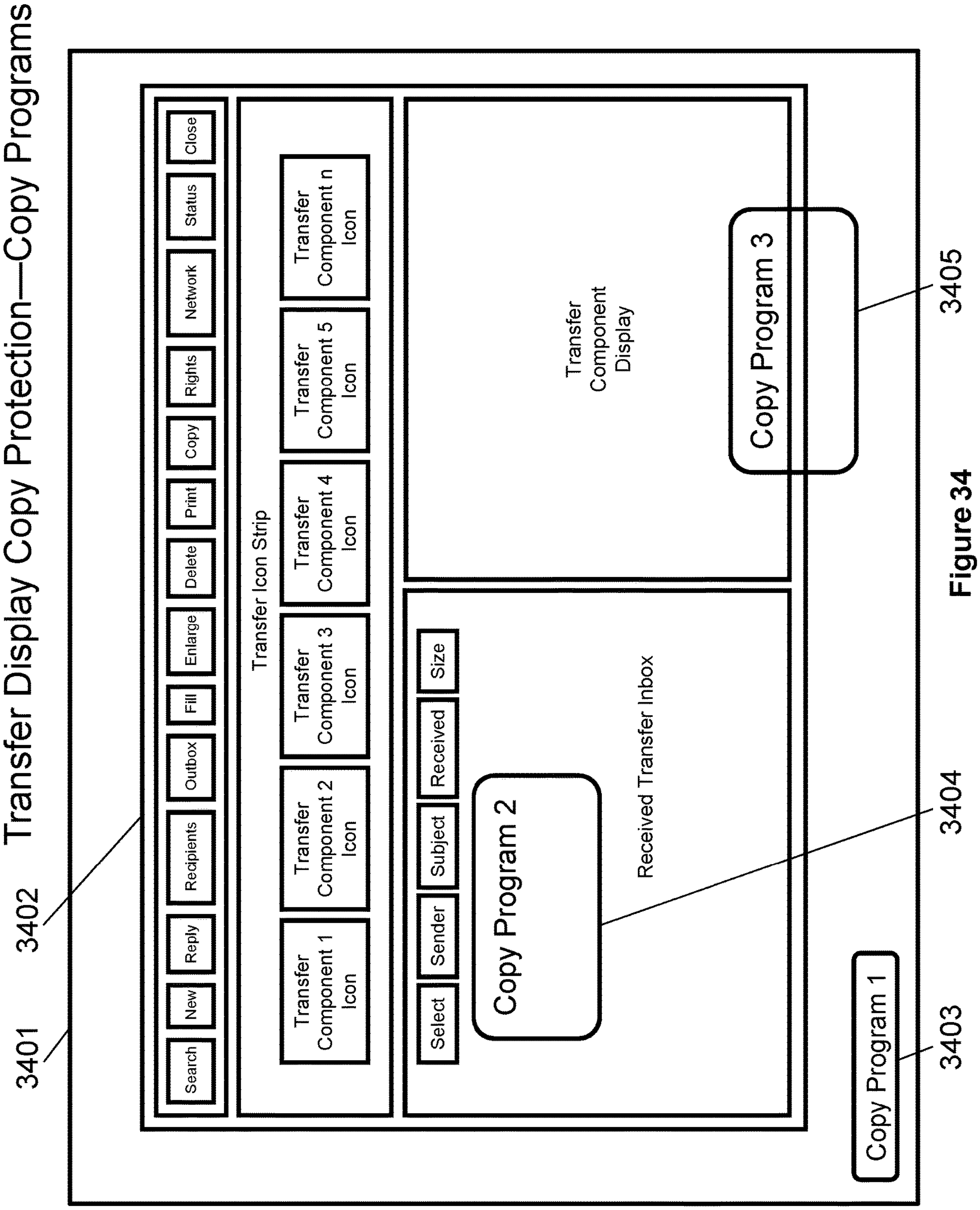
FIG. 34 shows a first copy program that is outside of RCCP's boundaries, a second copy program that is within RCCP's boundaries and in front of RCCP, and a third copy program that is partially within RCCP's boundaries and in front of RCCP.

FIG. 34 shows an RCCP 3402 that is within a computer's display or extended display boundaries 3401 with a first copy program 3403 that is outside of the RCCP's boundaries, a second copy program 3404 that is within the RCCP's boundaries and in front of the RCCP, and a third copy program 3405 that is partially within the RCCP's boundaries and in front of the RCCP.

Figure 35:
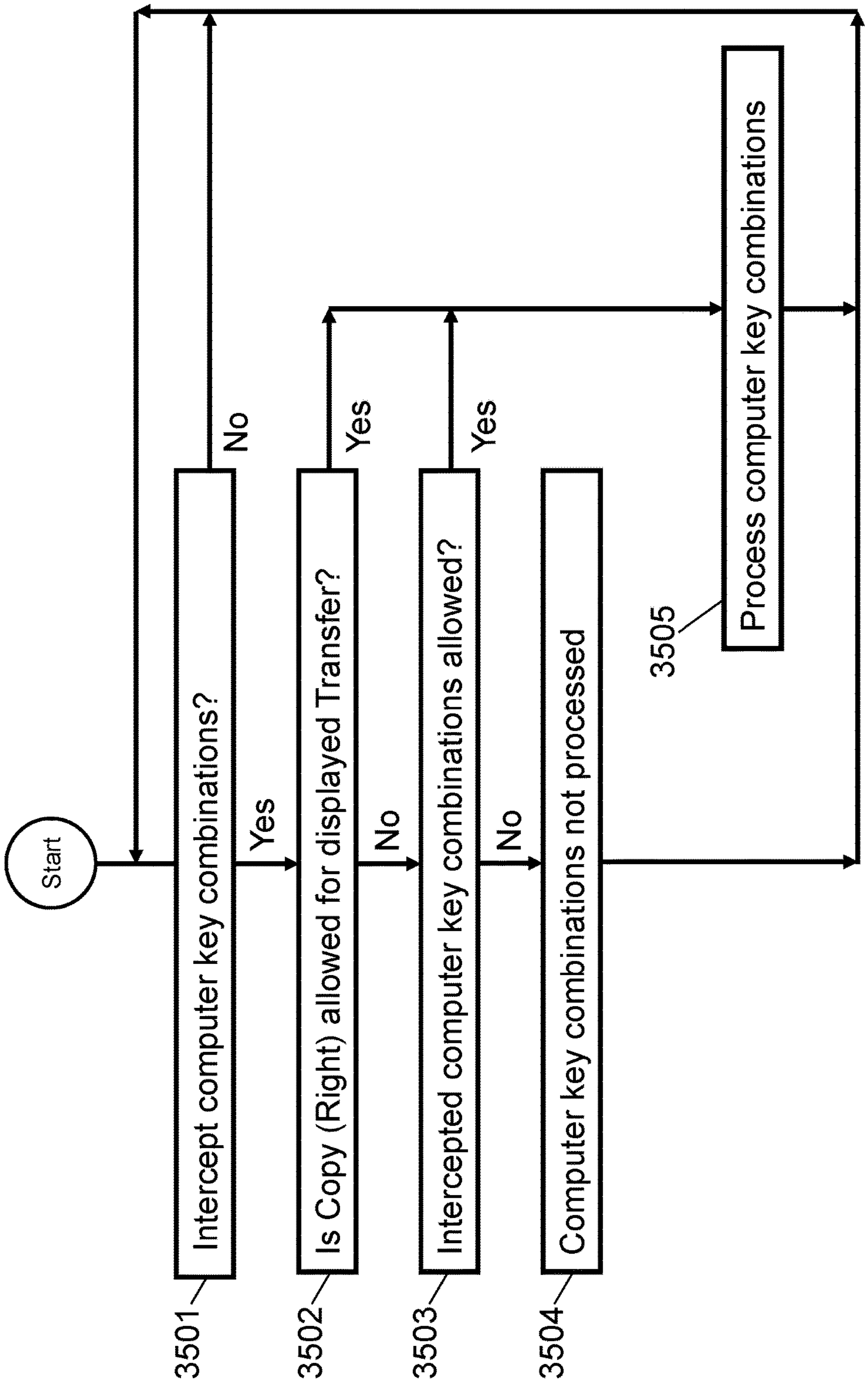
FIG. 35 shows a flowchart of RCCP intercepting computer keyboard combinations and enforcing applicable Rights.

FIG. 35 shows a flowchart for protecting a Transfer display from being copied by specific computer key combinations. The first step is to wait for one or more computer keys to be concurrently pressed and when pressed intercepting 3501 such computer key combinations. If such computer key combinations have been intercepted 3501, then the Rights are checked to determine if copying 3502 is permitted for the displayed Transfer. If copying 3502 is allowed, then the computer key combinations are processed 3505 and the process repeats waiting for one or more computer keys to be concurrently pressed. If copying 3502 is not allowed and the intercepted computer key combinations 3503 are not allowed, then such computer key combinations are not processed 3504 and the process repeats waiting for one or more computer keys to be concurrently pressed. If copying 3502 is not allowed and the intercepted computer key combinations 3503 are allowed, then the computer key combinations are processed 3505 and the process repeats waiting for one or more computer keys to be concurrently pressed.

Figure 36:
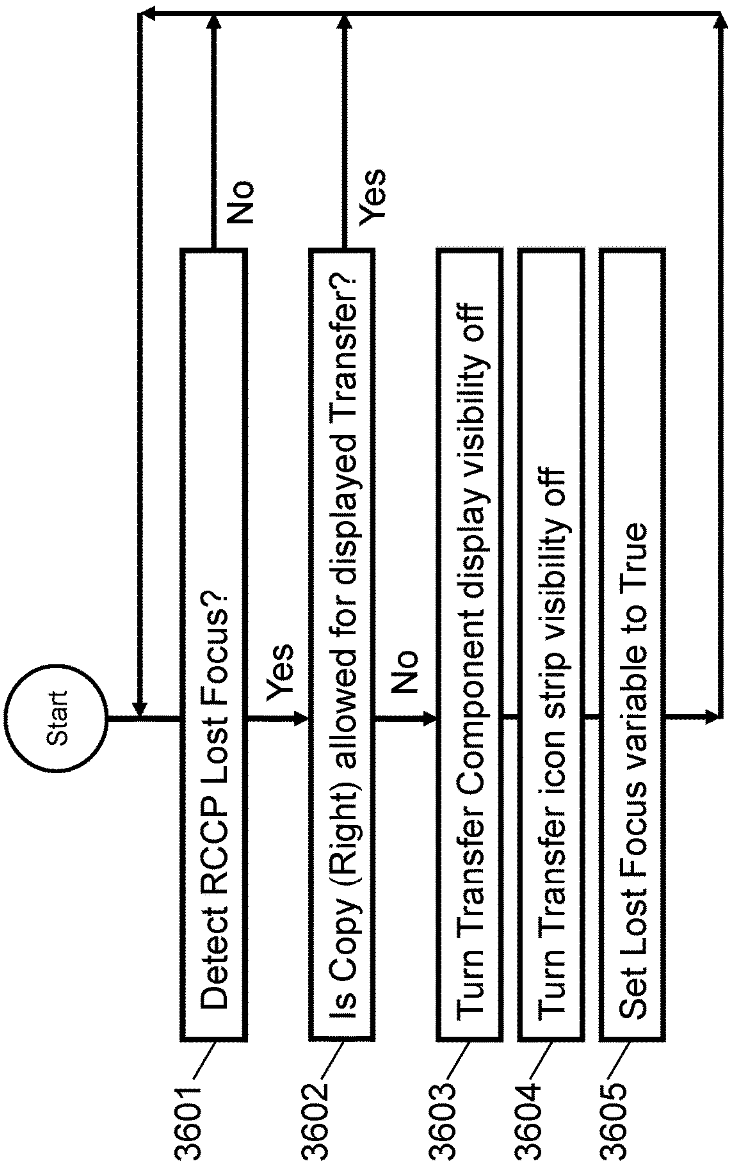
FIG. 36 shows a flowchart of RCCP disabling the visibility for the currently displayed Transfer Component and the Transfer icon strip when enforcing applicable Rights when RCCP loses Focus.

FIG. 36 shows a flowchart of RCCP related to FIG. 34, detecting 3601 if RCCP has lost focus and if it has focus to continue such detecting. When focus is lost 3601, the copy Right for the displayed Transfer is checked to determine if copying is allowed 3602. If copying is allowed 3602 then RCCP returns to detecting 3601 if it has lost focus. If copying is not allowed 3602, then the Transfer Component display visibility is turned off 3603, the Transfer icon strip visibility is turned off 3604, the lost focus state/variable is set 3605 to true, and RCCP returns to detecting 3601 if it has lost focus.

Figure 37:
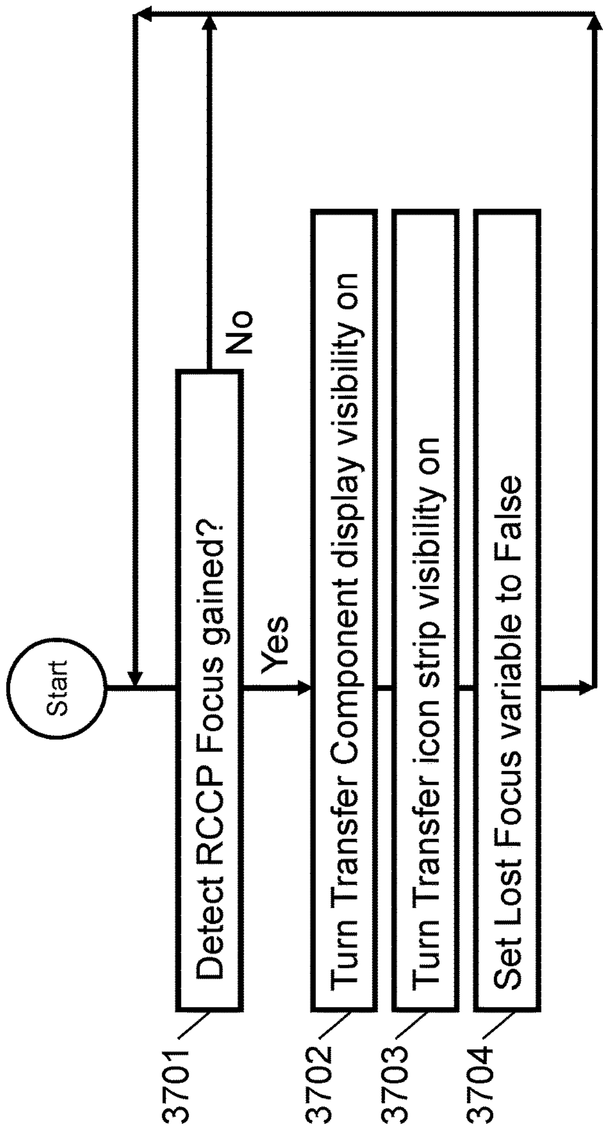
FIG. 37 shows a flowchart of RCCP enabling the visibility for the currently displayed Transfer Component and the Transfer icon strip when RCCP gains Focus.

FIG. 37 shows a flowchart of RCCP related to FIG. 34, detecting 3701 if RCCP has gained focus and if it has not gained focus to continue such detecting. When focus is gained 3701, then the Transfer Component display visibility is turned on 3702, the Transfer icon strip visibility is turned on 3703, the lost focus state/variable is set 3704 to false, and RCCP returns to detecting 3701 if it has gained focus.

Figure 38:
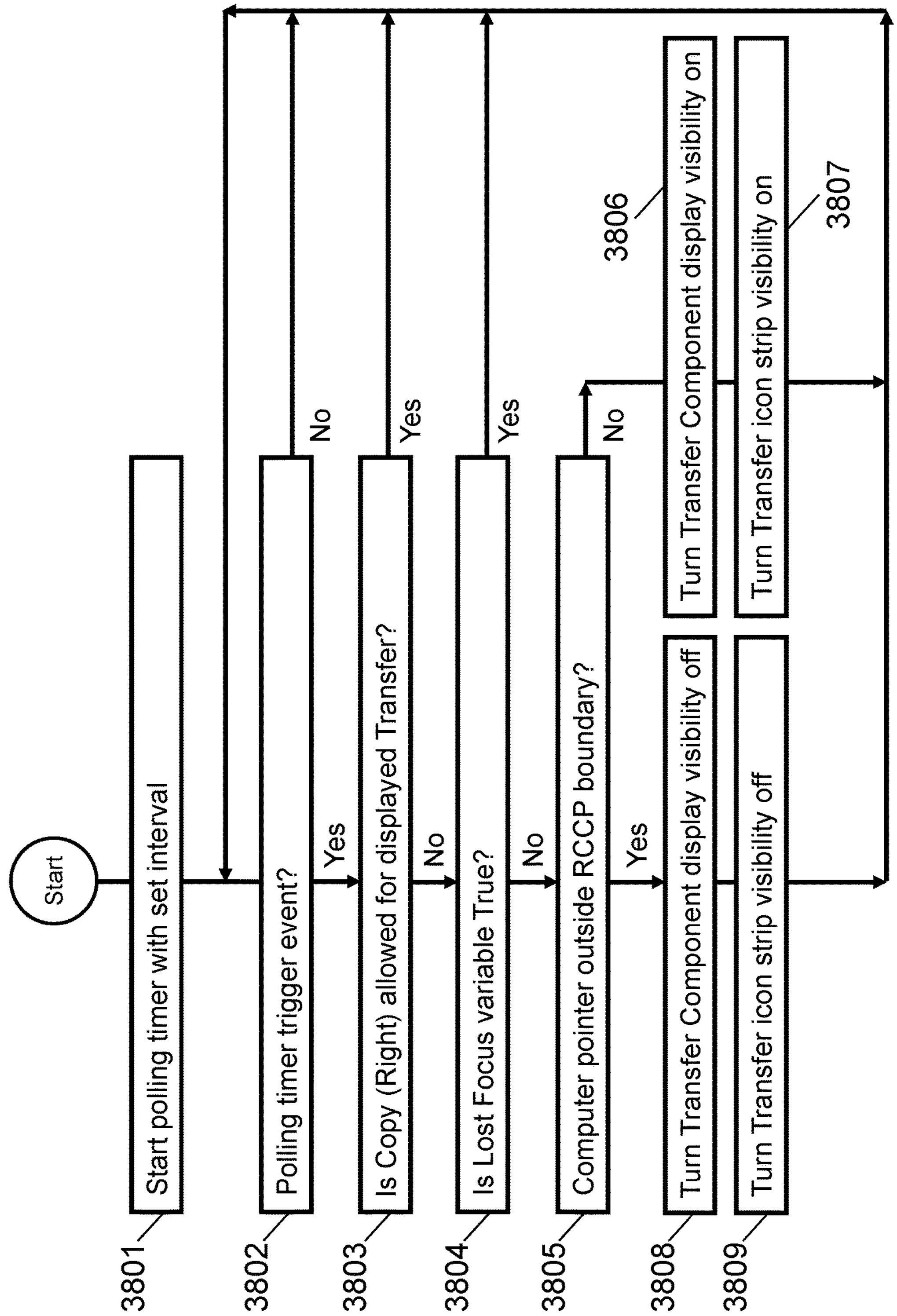
FIG. 38 shows a flowchart of RCCP disabling the visibility for the currently displayed Transfer Component and the Transfer icon strip when enforcing applicable Rights when the computer pointer (e.g. mouse) is outside of RCCP boundaries.

FIG. 38 shows a flowchart, related to FIGS. 34, 36 and 37, for protecting a Transfer display from being copied by the position of a computer pointer. A polling timer is started 3801with a set interval and if there is not a polling timer trigger event 3802, then RCCP continues to wait for such event. If there is a polling timer trigger event 3802, then the copy Right of the displayed Transfer is checked for allowing 3803 the copy of the displayed Transfer. If copying is allowed 3803 then RCCP returns to waiting for a polling timer trigger event 3802. If copying is not allowed 3803 and the lost focus state/variable 3804 is true, then RCCP returns to waiting for a polling timer trigger event 3802. If copying is not allowed 3803 and the lost focus state/variable 3804 is false and the computer pointer is outside 3805 of RCCP's boundary then the Transfer Component display visibility is turned off 3808 and the Transfer icon strip visibility is turned off 3809 and RCCP returns to waiting for a polling timer trigger event 3802. If copying is not allowed 3803 and the lost focus state/variable 3804 is false and the computer pointer is not outside 3805 of RCCP's boundary, then the Transfer Component display visibility is turned on 3806 and the Transfer icon strip visibility is turned on 3807 and RCCP returns to waiting for a polling timer trigger event 3802.

Figure 39:
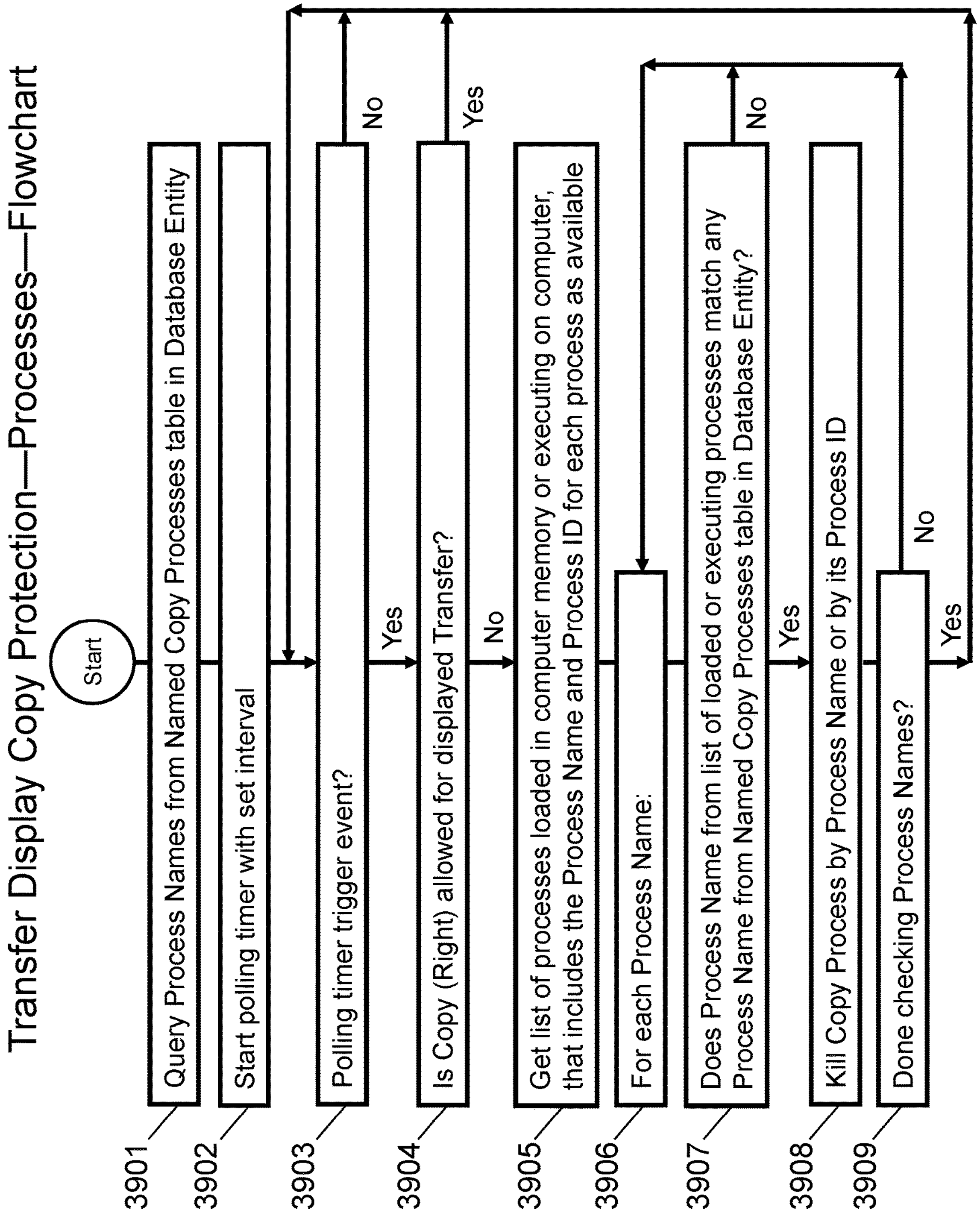
FIG. 39 shows a flowchart that stops execution of Named Copy Processes when enforcing applicable Rights, where such process names are provided from a Named Copy Processes table in a Database Entity, which are compared against names of computer processes loaded in memory or executing.

FIG. 39 shows a flowchart for protecting a Transfer display from being copied by any Named Copy Processes. Process names are queried 3901 from a Named Copy Processes table in a Database Entity. A polling timer is started 3902 with a set interval and if there is not a polling timer trigger event 3903, then wait for such event. If there is a polling timer trigger event 3903, then the copy Right of the displayed Transfer is checked for allowing 3904 the copy of the displayed Transfer. If copying is allowed 3904, then wait for a polling timer trigger event 3903. If copying is not allowed 3904, then get a list of processes 3905 currently loaded in computer memory or executing on such computer, where the list includes each process name and process identifier as available. For each process name 3906 from the list of processes 3905, determine if it matches 3907 any process name 3901 from the Named Copy Processes table. If such process name 3906 does not match 3907 any process name 3901 from the Named Copy Processes table, then the next a process name 3906 from the list of processes 3905 is checked for a match 3907, until the list of processes 3905 is exhausted and then wait for a polling timer trigger event 3903. If a process name 3906 does match 3907 any process name 3901 from the Named Copy Processes table, then kill or stop 3908 such computer process by its process name or process identifier. If each process name 3906 from the list of processes 3905 has been checked 3909, then wait for a polling timer trigger event 3903, otherwise continue with the next process name 3906 from the list of processes 3905.

Figure 40:
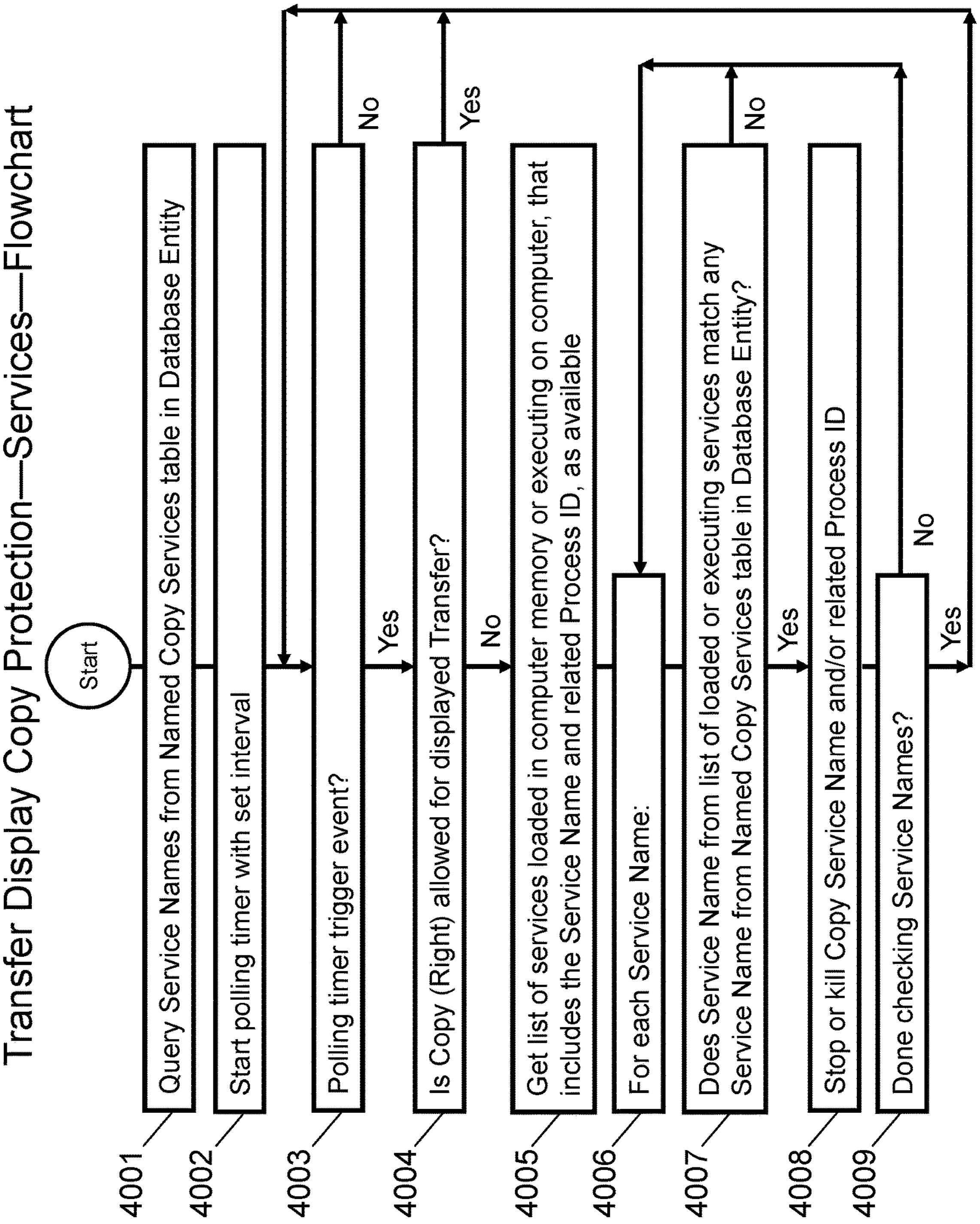
FIG. 40 shows a flowchart that stops execution of Named Copy Services when enforcing applicable Rights, where such service names are provided from a Named Copy Services table in a Database Entity, which are compared against names of services loaded in memory or executing.

FIG. 40 shows a flowchart for protecting a Transfer display from being copied by any Named Copy Services. Service names are queried 4001 from a Named Copy Services table in a Database Entity. A polling timer is started 4002 with a set interval and if there is not a polling timer trigger event 4003, then wait for such event. If there is a polling timer trigger event 4003, then check whether the copy Right of the displayed Transfer allows 4004 copying of the displayed Transfer. If copying is allowed 4004, then wait for a polling timer trigger event 4003. If copying is not allowed 4004, then get a list of computer services 4005 currently loaded in computer memory or executing on such computer, where the list includes each service name and related process identifier as available. For each service name 4006 from the list of services 4005, determine if it matches 4007 any service name 4001 from the Named Copy Services table. If such service name 4006 does not match 4007 any service name 4001 from the Named Copy Services table, then the next service name 4006 from the list of services 4005 is checked for a match 4007 until the list of services 4005 is exhausted and then wait for a polling timer trigger event 4003. If a service name 4006 does match 4007 a service name 4001 from the Named Copy Services table, then stop or kill 4008 such computer service by its service name and/or related process identifier. If each service name 4006 from the list of services 4005 has been checked 4009, then wait for a polling timer trigger event 4003, otherwise continue with the next service name 4006 from the list of services 4005.

Figure 41:
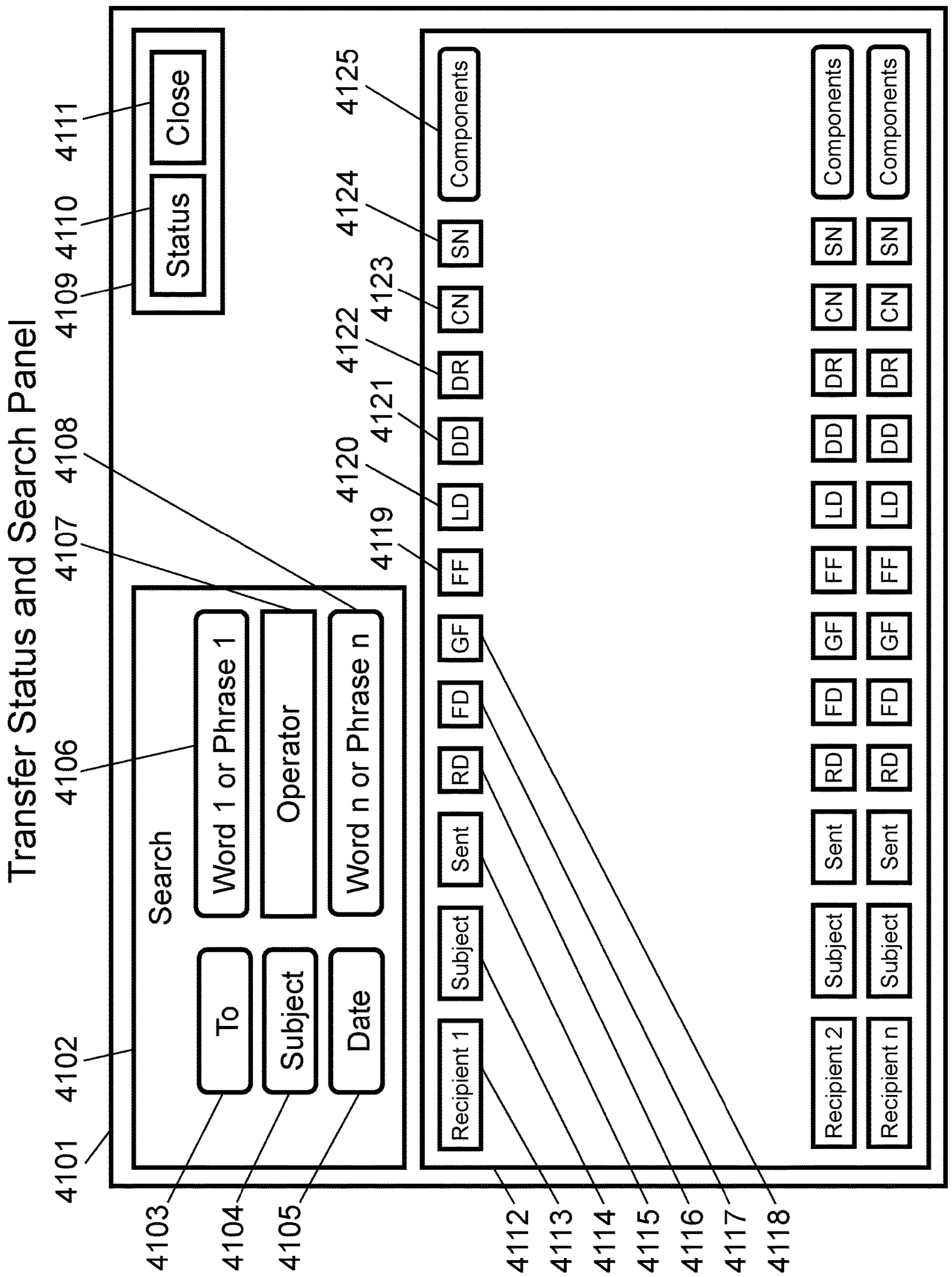
FIG. 41 shows a Transfer status panel that displays for each Transfer the Recipient, subject, when sent, and the Transfer Status, allows searching on Transfers, and has a control to display the Transfer Component status panel associated with such Transfer.

FIG. 41 shows a panel 4101 for Transfer Status with a portion 4102 of the panel for searching and retrieving Transfers that match search criteria including (i) to whom 4103 the Transfer was sent; (ii) the subject of the Transfer 4104; (iii) a date range or after date 4105 for when the Transfer was sent; (iv) a word or phrase 4106; and (v) if more than one word or phrase 4108 then a Boolean operator 4107 is specified as to how to treat each additional word or phrase 4108. There is portion 4109 of the panel 4101 that contains controls to (i) display status 4110; and (ii) close or hide 4111 the panel 4101. Another portion 4112 of the panel 4101 displays for each Transfer (i) the Recipient 4113; (ii) the subject 4114; (iii) the Transfer Status 4115-4124; and (iv) a control 4125 to display the Transfer Component Status panel associated with such Transfer. Transfers can be sorted by column header including the Recipient 4113, subject 4114, and the components of the Transfer Status 4115-4124 by selecting the column header. Successive selection of a column header will toggle the Transfer sort order between ascending and descending order for such column. If a search 4102 has been executed, then the information in portion 4112 of the panel is the result of the search that matches the search criteria or if no criteria is matched, the information remains unchanged. If no search or column sort has been executed, then Transfers are sorted in chronological descending order from the date and time they were sent. For each Transfer, the Transfer Status includes (i) the date and time the Transfer was received by Recipient 4116; (ii) whether the Transfer has been forwarded to another Recipient 4117; (iii) whether the Transfer was augmented by Recipient before forwarding to other Recipients 4118; (iv) whether the Transfer has been forwarded to another Recipient and is a Friend of the Sender, such Friend's User ID 4119; (v) whether the Transfer is currently locked and the date and time of such locking 4120; (vi) whether the Transfer has been deleted by the Recipient and the date and time of such deletion 4121; (vii) whether the Transfer has been deleted according to the Rights associated with a Transfer and the date and time of such deletion 4122; (viii) whether the execution of a copy program has been stopped and the name of such copy program 4123; and (ix) whether the execution of a copy service has been stopped and the name of the copy service 4124.

Figure 42:
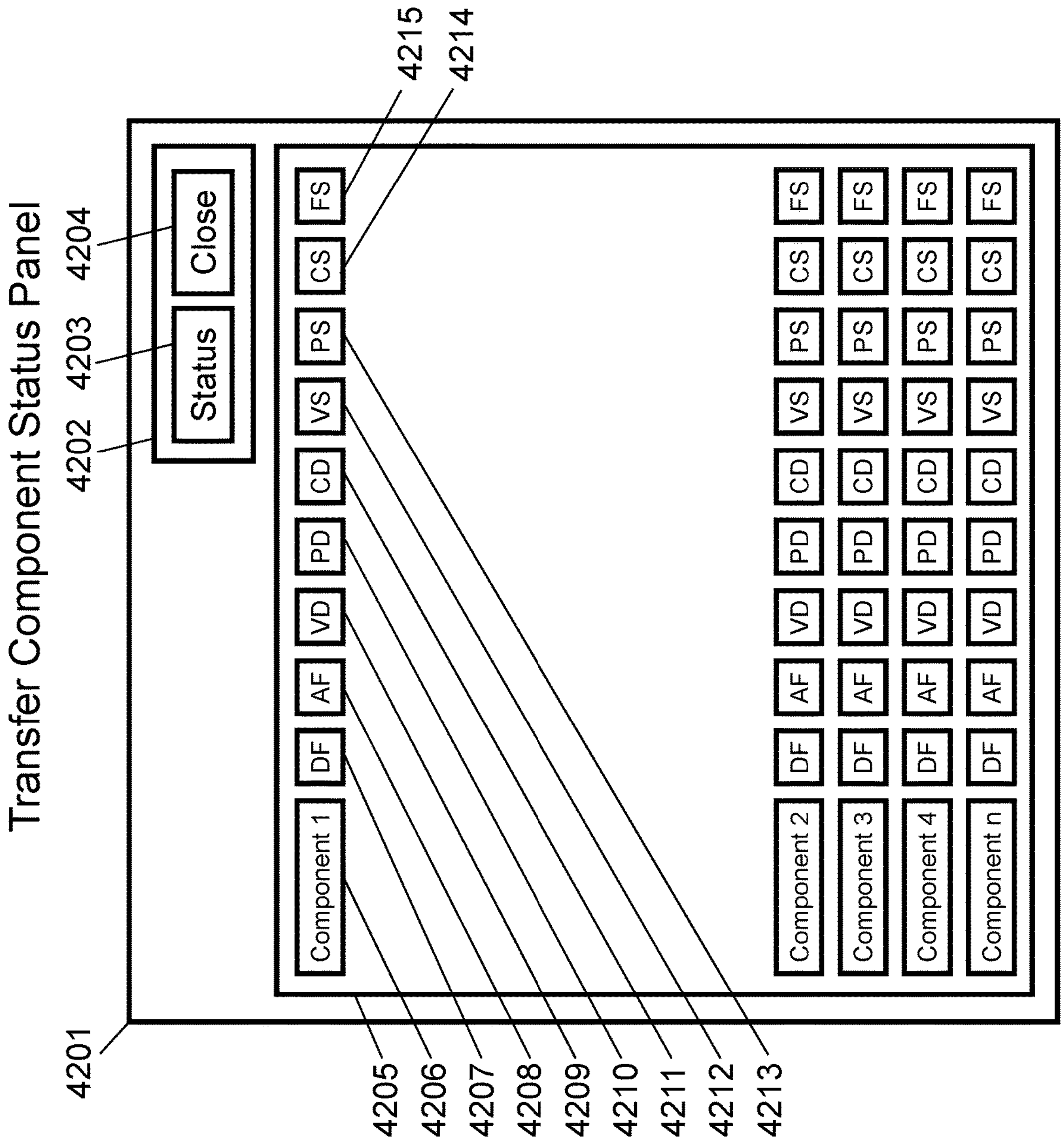
FIG. 42 shows a Transfer Component status panel that displays the Transfer Component Status for each Transfer Component in a Transfer.

FIG. 42 shows a panel 4201 for the Transfer Component Status for a particular Transfer with a portion 4202 of the panel containing controls to (i) display status 4203; and (ii) close or hide 4204 the panel 4201. Another portion 4205 of the panel contains the status of each Transfer Component including (i) the component number 4206; (ii) whether the Transfer Component has been deleted before forwarding the Transfer to other Recipients 4207; (iii) whether the Transfer Component has been altered before forwarding the Transfer to other Recipients 4208; (iv) if it has been viewed 4209; (v) if it has been printed 4210; (vi) if it has been copied 4211; (vii) if viewing has been stopped 4212; (viii) if printing has been stopped 4213; (ix) if copying has been stopped 4214; and (x) if forwarding has been stopped 4215.

Figure 43:
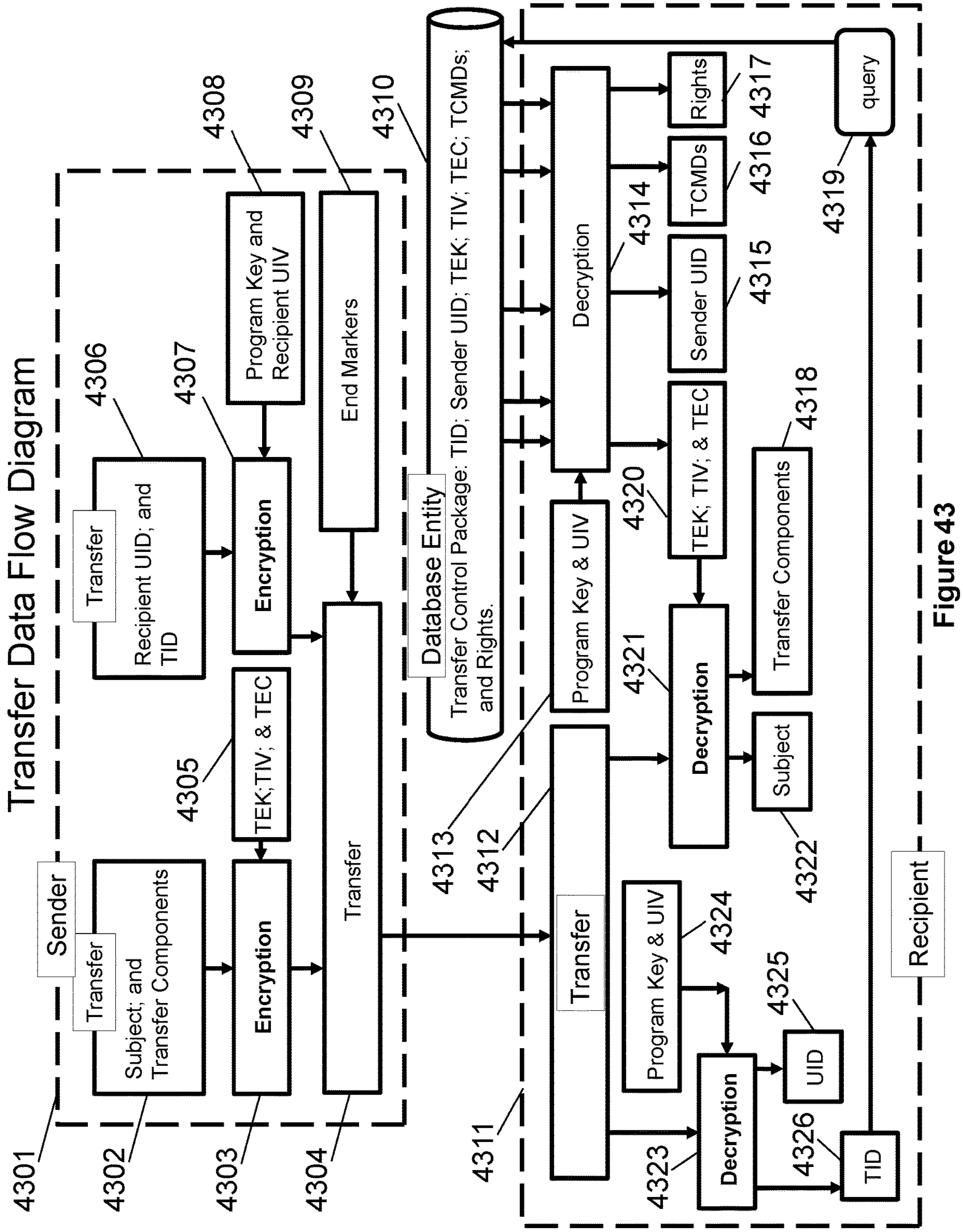
FIG. 43 is a diagram of Transfer data flow between Sender and Recipient and shows how data is Encrypted or Decrypted with particular Encryption Keys, Encryption Initialization Vectors, and Transfer Encryption Count when applicable.

FIG. 43 shows a flowchart that describes how a Transfer's data flows between a Sender and Recipient and how data is Encrypted or Decrypted with particular Encryption keys, Encryption initialization vectors, and Transfer Encryption Count when applicable. After the Sender 4301 composes the subject of a Transfer and Transfer Components 4302, the Recipient User ID 4306 is Encrypted 4307 using the Program Key and Recipient User Encryption Initialization Vector 4308. The generated Transfer ID 4306 is Encrypted 4307 twice using the Program Key and Recipient User Encryption Initialization Vector 4308. The subject of the Transfer and Transfer Components 4302 are Encrypted 4303 the number of times specified by Transfer Encryption Count using the Transfer Encryption Key and Transfer Encryption Initialization Vector 4305. Such elements including Recipient User ID, Transfer ID, Transfer subject, Transfer Components and their unencrypted End Markers 4309 are assembled into a Transfer 4304. The Transfer 4304 is transmitted to a Recipient 4311, where the Encrypted Recipient User ID is read from the received Transfer 4312 and Decrypted 4323 using the Program Key and Recipient User Encryption Initialization Vector 4324 to yield an unencrypted Recipient User ID 4325. The twice Encrypted Transfer ID is read from the received Transfer 4312 and Decrypted 4323 one-time using the Program Key and Recipient User Encryption Initialization Vector 4324 to yield a one-time encrypted Transfer ID 4326. The Transfer Control Package table in Database Entity 4310 is queried 4319 using the one-time encrypted Transfer ID 4326 for the Encrypted Sender User ID, Transfer Encryption Count, Transfer Encryption Initialization Vector, and Transfer Encryption Key which are then Decrypted 4314 using the Program Key and Recipient User Encryption Initialization Vector 4313 to yield unencrypted forms of the (i) Sender User ID 4315; and (ii) Transfer Encryption Count, Transfer Encryption Initialization Vector, and Transfer Encryption Key 4320. The unencrypted Sender User ID 4315 is authenticated against the Recipient Friends User ID list and the Encrypted subject of the Transfer 4312 is Decrypted 4321 the number of times specified by the Transfer Encryption Count using the Transfer Encryption Key and Transfer Encryption Initialization Vector 4320 to yield the unencrypted subject 4322. The Transfer 4312 is saved to Storage and the unencrypted subject 4322 of the Transfer is displayed. When a Transfer is selected from the Recipient inbox, the Transfer is loaded from Storage into computer memory and the twice Encrypted Transfer ID is read from such Transfer 4312 and Decrypted 4323 one-time using the Program Key and Recipient User Encryption Initialization Vector 4324 to yield a one-time encrypted Transfer ID 4326. The Transfer Control Package table in Database Entity 4310 is queried 4319 using the one-time encrypted Transfer ID 4326 for the Encrypted Sender User ID, Transfer Encryption Count, Transfer Encryption Initialization Vector, Transfer Encryption Key, and Rights which are then Decrypted 4314 using the Program Key and Recipient User Encryption Initialization Vector 4313 to yield unencrypted forms of the Sender User ID 4315, Transfer Encryption Count, Transfer Encryption Initialization Vector, and Transfer Encryption Key 4320, and Rights 4317. If the Sender User ID 4315 does not authenticate against the Recipient Friends User ID list then the process is done. Otherwise, if the Sender User ID 4315 does authenticate, the applicable Rights for the Transfer are enforced. If the Transfer is not available after Rights enforcement then the process is done, otherwise the Transfer Control Package table in Database Entity 4310 is queried 4319 using the one-time encrypted Transfer ID 4326 for the Transfer Component Message Digests associated with the Transfer Components of the Transfer 4312. For each Transfer Component (i) the associated Transfer Component Message Digest is Decrypted 4314 using the Program Key and Recipient User Encryption Initialization Vector 4313 to yield the unencrypted Transfer Component Message Digest 4316; (ii) the associated Encrypted Transfer Component from Transfer 4312 is then Decrypted 4321 the number of times specified by the Transfer Encryption Count using the Transfer Encryption Key and Transfer Encryption Initialization Vector 4320 to yield an unencrypted Transfer Component 4318; (iii) if such Transfer Component is compressed, it is then decompressed; (iv) a Transfer Component Message Digest for the unencrypted Transfer Component 4318 is generated and compared against the unencrypted Transfer Component Message Digest 4316 from the Transfer Control Package table in the Database Entity 4310; (v) if the Transfer Component Message Digests do not match, the Transfer Component is deleted from computer memory and a "bad" Transfer Component icon is generated. Otherwise, if there is a match, then a Transfer Component icon is generated. If there are no more Transfer Components in the Transfer, then the first Transfer Component is displayed and the Transfer Component icon strip is populated with an icon representing each Transfer Component and such icons are displayed with the first icon in the Transfer Component icon strip being highlighted and the process is done. If there are more Transfer Components in the Transfer then the process continues for the next Transfer Component.

The invention claimed is:

1. A system for exchanging secure and controlled messages between a first entity and a second entity, comprising:
- at least one data store;
- a communications network;
- software operating on one or more processors in communication with said data store wherein said software allows for composing, uploading, encrypting, decrypting, saving, downloading, and streaming messages, as well as interacting with at least one database located in said data store;
- the database comprising tables that pertain to users of the system, message identification and encryption configuration, message rights and status for each message recipient, message sender user identification, wherein said database is accessible to both a first entity and a second entity;
- the system having an input means for the first entity and the second entity, each entity having access to a computing device having said software that can execute instructions or proxy software that can send instructions to said software related to message creation, delivery, reading, and management;
- wherein to send a secure and controlled message from the first entity to the second entity, a sender and each recipient operate said client software to facilitate the following steps:
- the system provides an interface for the sender to compose a message using or instructing said software, upload related message elements to transfer storage, and saves the message identification, sender user identification, and message rights associated with message elements for each recipient to said database;
- the system allows each recipient of the message to query the database to obtain the associated message rights;
- the system allows each recipient to stream or download the message elements from said transfer storage for display, if permitted by the message rights associated with the message elements; and
- the system allows each recipient of the message to write a message transfer status and a transfer component status to said database.

2. The system of claim 1 wherein said database further records attempts to circumvent message rights by any message recipient.

3. The system of claim 1 wherein said database further records the copy process or service name as applicable, associated software vendor as available, and copy software name as available for attempts to circumvent a no copy message right by any message recipient.

4. The system of claim 1 wherein said data store is part of a cloud computing service or network server.

5. The system of claim 1 wherein each message is controlled through enforcement of message rights from said database for associated message elements.

6. The system of claim 1 wherein after the message is received by a recipient, a message transfer status and a transfer component status are reported to said database that allows the message sender to understand the status of the message including actions taken on the message, disposition of the message, attempts to circumvent the message rights, and details of circumventing a no copy message right.

7. The system of claim 1 wherein after the message is sent by an originating message author, the originating message author may alter the message rights stored in said database for one or more selected recipients, subsequently controlling the message at all recipients that have received the message regardless if the message has been modified, augmented, and/or forwarded.

8. The system of claim 1 wherein a unique message identifier is generated before a message is sent by the sender to the recipient.

9. The system of claim 6 wherein said actions taken on the message comprise any viewing, printing, copying, forwarding, deleting, deleting of message elements before forwarding, and altering of message elements before forwarding.

10. The system of claim 9 wherein the message is deleted after permitted number of views is reached.

11. The system of claim 6 wherein said disposition of the message comprises any deletion by message recipient with corresponding date and time, deletion after a particular date and time, or locking the message to disable opening with a corresponding date and time.

12. The system of claim 1 wherein said database includes profiles of users.

13. The system of claim 1 wherein said software operating on one or more processors comprises remote software, wherein said remote software operates remotely from entities sending instructions to said remote software.

14. The system of claim 1 wherein said database further comprises tables containing information about user devices.

15. The system of claim 1 wherein said database further comprises tables containing information about preferences of users of the system.

16. The system of claim 11 wherein the message is deleted after a particular date and time.

17. The system of claim 11 wherein the message is locked after a particular date and time.

18. The system of claim 6 wherein said details of circumventing a no copy message right comprise that the execution of a copy program or service has been stopped and a name of such copy program or service if available.

* * * * *